(12) United States Patent
Hunwick

(10) Patent No.: US 10,883,156 B2
(45) Date of Patent: Jan. 5, 2021

(54) RECOVERY OF LITHIUM FROM SILICATE MINERALS

(71) Applicant: Richard Hunwick, New South Wales (AU)

(72) Inventor: Richard Hunwick, New South Wales (AU)

(73) Assignee: ICSIP PTY LTD, Sydney (AU)

( * ) Notice: Subject to any disclaimer, the term of this patent is extended or adjusted under 35 U.S.C. 154(b) by 0 days.

(21) Appl. No.: 16/064,342

(22) PCT Filed: Dec. 22, 2016

(86) PCT No.: PCT/AU2016/051278
§ 371 (c)(1),
(2) Date: Jun. 20, 2018

(87) PCT Pub. No.: WO2017/106925
PCT Pub. Date: Jun. 29, 2017

(65) Prior Publication Data
US 2019/0003010 A1 Jan. 3, 2019

(30) Foreign Application Priority Data

Dec. 22, 2015 (AU) ................................ 2015905317
Mar. 2, 2016 (AU) ................................ 2016900774

(51) Int. Cl.
| | | |
|---|---|---|
| *C22B 26/12* | (2006.01) | |
| *C22B 3/02* | (2006.01) | |
| *C22B 3/06* | (2006.01) | |
| *C22B 3/22* | (2006.01) | |
| *C22B 3/44* | (2006.01) | |
| *C01D 15/02* | (2006.01) | |
| *C01D 15/08* | (2006.01) | |
| *C22B 5/10* | (2006.01) | |

(52) U.S. Cl.
CPC .............. *C22B 26/12* (2013.01); *C01D 15/02* (2013.01); *C01D 15/08* (2013.01); *C22B 3/02* (2013.01); *C22B 3/065* (2013.01); *C22B 3/22* (2013.01); *C22B 3/44* (2013.01); *C22B 5/10* (2013.01); *Y02P 10/20* (2015.11)

(58) Field of Classification Search
None
See application file for complete search history.

(56) References Cited

U.S. PATENT DOCUMENTS

| | | |
|---|---|---|
| 1,531,336 A | 3/1925 | Halvorson et al. |
| 1,863,986 A | 6/1932 | Jourdan |
| 1,976,564 A | 10/1934 | Jourdan |
| 2,021,988 A | 11/1935 | Corson et al. |
| 2,024,026 A | 12/1935 | Coleman et al. |
| 3,965,239 A | 6/1976 | Posel |
| 5,350,717 A | 9/1994 | Day et al. |

FOREIGN PATENT DOCUMENTS

| | | |
|---|---|---|
| CL | 2012003278 A1 | 3/2013 |
| CN | 1299884 A | 6/2001 |
| CN | 102765734 A | 11/2012 |
| CN | 105039699 A | 11/2015 |
| GB | 402977 | 12/1933 |
| JP | H02442 A | 1/1990 |
| JP | H024442 | 1/1990 |
| JP | H1154159 | 2/1999 |
| WO | WO2011082444 | 7/2011 |
| WO | WO2011082444 A1 | 7/2011 |
| WO | WO2013140039 | 9/2013 |
| WO | WO2013140039 A1 | 9/2013 |
| WO | WO2014026217 | 2/2014 |
| WO | WO2014026217 A1 | 2/2014 |
| WO | WO2015123762 | 8/2015 |
| WO | WO2015123762 A1 | 8/2015 |
| WO | WO2015155684 | 10/2015 |
| WO | WO2015155684 A2 | 10/2015 |

OTHER PUBLICATIONS

International Search Report from International Application No. PCT/FR2016/053518, dated Mar. 1, 2017.
Xinjiang's Gems and Jades, mainly written and compiled by Hanchen Yang, et al., 2nd edition, p. 56, Xinjiang People's Publishing House, published on Jan. 31, 2012.
Production Technology of Inorganic Fine Chemicals, 1st edition mainly written and compiled by Hong Liu, et al., Chemical Industry Press, p. 112, Jul. 31, 2008.
Pratima Meshram et al. "Extraction of Lithium from primary and secondary sources by pre-treatment, leaching and separation: A comprehensive review" Hydrometallurgy; vol. 150, Dec. 1, 2014; pp. 192-208.
English Translation of Chinese Search Report dated Feb. 6, 2019 from corresponding Chinese Application No. 201610154532.X.
Supplementary European Search Report dated May 24, 2019 from corresponding European Application No. 16 87 7014.
Chilean Search Report dated Aug. 12, 2019 from corresponding Chilean Application No. 201801689.
Chinese Search Report dated Nov. 18, 2019 from corresponding Chinese Application No. 2016800751031.

*Primary Examiner* — Melissa S Swain
(74) *Attorney, Agent, or Firm* — Davidson, Davidson & Kappel, LLC

(57) ABSTRACT

A process and system are disclosed for recovering lithium from a lithium-containing silicate mineral. The process and system comprise mixing the silicate mineral with nitric acid. The process and system also comprise subjecting the mixture to a leaching process having conditions such that lithium values in the silicate mineral are leached from the silicate mineral as lithium nitrate. The nitric acid can be in aqueous, gaseous or precursor gaseous form.

24 Claims, 4 Drawing Sheets

RECOVERY OF LITHIUM FROM SILICATE MINERALS

This application is a U.S. national phase application under 35 U.S.C. of § 371 of International Application No. PCT/AU2016/051278, filed Dec. 22, 2016, which claims priority of Australian Patent Application No. 2016900774, filed Mar. 2, 2016, and Australian Patent Application No. 2015905317, filed Dec. 22, 2015 the disclosures of which are hereby incorporated by reference herein.

TECHNICAL FIELD

A process, system and apparatus are disclosed for the recovery of lithium values from silicate-rich minerals that include lithium, including hard-rock minerals, and clay and micaceous minerals. The process, system and apparatus also relate to the conversion of these values to pure lithium chemicals (in particular lithium oxide, lithium hydroxide and lithium carbonate) as well as lithium metal, being products in demand by, in particular, lithium battery manufacturers.

BACKGROUND ART

Lithium occurs widely throughout the Earth's crust, with its average concentration being around 20 parts per million. This concentration compares with that of other valuable metals such as cobalt, but is much lower than iron and aluminium, yet lithium is far more abundant than the precious metals gold and platinum. While further exploration is adding to the world's lithium resource estimates, there are still concerns over the adequacy of these resources for applications where uses of lithium are likely to grow substantially over coming years and decades, notably batteries.

Lithium batteries even now allow electricity to be stored in usefully large quantities per unit of battery weight: at least 150 Watt-hours per kilogram (Wh/kg), preferably 250 Wh/kg, with perhaps 1,500 Wh/kg possible in the longer term. Such storage intensities will allow electricity to penetrate road transport markets hitherto entirely dominated by petroleum fuels, and will accelerate the development and deployment of electricity generation systems utilising the inherently intermittent renewable energy sources such as wind and sun.

Recovering lithium from seawater is likely to remain prohibitively expensive because of its very low concentrations (less than 0.2 parts per million by weight), even though the total quantity in seawater vastly exceeds any foreseeable demands, at more than 200 billion tonnes of the metal.

Economic supplies of the lithium and lithium chemicals needed to make lithium batteries are currently dominated by brines from South American salt lakes (salars) in the so-called 'Lithium Triangle' that extends across areas of Argentina, Bolivia and Chile. However, security of supply from these salars is jeopardised by sovereign risk issues, environmental challenges, and doubts over just how much economically recoverable lithium is contained in these salars.

Lithium is also recovered from certain hard-rock silicate minerals. However, until recently, there was little interest in exploring for hard-rock lithium mineral deposits, firstly because perceptions have been that there was an abundance of lithium in the salars of the Lithium Triangle; and, secondly, because current hard-rock lithium ore refining processes (largely unchanged since before World War II) are expensive, complicated, hazardous and environmentally challenging.

With the benefit of a markedly superior process, the world's rapidly increasing hard-rock lithium resources may be developed to the benefit of battery manufacturers, affording them greater confidence that lithium supplies for batteries will be secure over the longer term, and met at lower overall cost, than otherwise.

A reference herein to the background or prior art does not constitute an admission that such art forms part of the common and/or general knowledge of a person of ordinary skill in the art. Such a reference is not intended in any way to limit the process and system as set forth herein.

SUMMARY OF THE DISCLOSURE

Disclosed herein is an improved process for recovering lithium from lithium-containing silicate minerals such as may be frequently found in a class of crystalline rocks known as pegmatites. The lithium-containing silicate minerals can include the hard-rock mineral spodumene ($LiAlSi_2O_6$) and/or any of a range of other lithium-containing silicate minerals, including but not limited to, the hard-rock minerals petalite $LiAlSi_4O_{10}$ and eucryptite $LiAlSiO_4$, and minerals in the mica group including amblygonite $(Li,Na)AlPO_4(F,OH)$, lepidolite $K(Li,Al,Rb)_3(Al,Si)_4O_{10}(F,OH)_2$ and zinnwaldite $KLiFeAl(AlSi_3)O_{10}(OH,F)_2$. Lithium may also be present in certain clays that are the result of partial weathering of such minerals, including hectorite $Na_{0.3}(Mg,Li)_3Si_4O_{10}(OH)_2$ and in the newly discovered (2006) sodium-lithium borosilicate mineral jadarite $LiNaSiB_3O_7(OH)$.

Throughout this specification, any and all references to the mineral 'spodumene' should be taken to include all lithium-containing metal silicate minerals, both hard-rock and clay, including those listed above.

In a broad sense, a process is disclosed herein for recovering lithium from a lithium-containing silicate mineral.

The process comprises mixing the silicate mineral with nitric acid. The process also comprises subjecting the mixture to a leaching process having conditions such that lithium values in the silicate mineral are leached from the silicate mineral as lithium nitrate.

Typically the leaching with nitric acid occurs in an aqueous phase. However, the inventor has discovered that lithium values in the silicate mineral may be efficiently converted to nitrates using nitric acid that is in vapour form, together with oxides of nitrogen, notably nitric oxide (NO) and nitrogen dioxide ($NO_2$), (collectively denoted NOx), oxygen (including in air), and water vapour; such a blend of gases and vapours, which in practice are precursors to nitric acid, may perform in a similar manner to nitric acid when in contact with the pre-treated lithium-containing silicate mineral. Thus, in the context of this specification, these different phases may be deemed to be a form of nitric acid. Hence, throughout this specification, any and all references to "nitric acid" should be interpreted to include gaseous phase precursors to nitric acid, gaseous phase nitric acid, as well as nitric acid in the aqueous phase.

The use of nitric acid as a lixiviant uniquely allows for the convenient and economical conversion of the lithium values extracted by this acid, into lithium oxide (lithia). Lithia is an ideal starting point for the manufacture of pure, marketable lithium chemicals including:

the hydroxide (either in the anhydrous form LiOH or the monohydrate $LiOH.H_2O$), the carbonate ($Li_2CO_3$)—lithium accounting is usually expressed in the industry in terms of lithium carbonate equivalent or LCE), and lithium as the metallic element—a form increasingly in demand for new-generation designs of lithium batteries, and for alloying purposes (e.g. the production of lithium-aluminium alloys that are finding favour in aerospace industries and other applications where high strength and temperature resistance combined with light weight, are particularly valued).

The use of nitric acid as a lixiviant can also avoid the need to purchase and consume expensive and hazardous chemicals such as sulphuric acid and sodium carbonate (soda ash). The process can also avoid the production of unwanted by-products such as sodium sulphate or analcite (analcime). The reason for this is that nitric acid, once consumed in the digestion process, may be almost fully recovered and recycled, which is to say, use of nitric acid allows for a 'closed' process. The process may also involve a minimum of processing steps. The process can also be environmentally benign, including limiting emissions of the greenhouse gas carbon dioxide.

In one embodiment, the silicate mineral pre-treatment may comprise thermal treatment such as by calcination, wherein the temperature of the solids may be raised to temperatures adequate to bring about a phase-change e.g. in the natural α spodumene, to convert it to a more active β form.

In another embodiment, the pre-treatment may be non-thermal such as may be provided by the high-intensity grinding of the mineral to produce intense mechanical shear (e.g. in a stirred mill such as an Isamill™). This can divide the particles sufficiently finely as to allow a lixiviant efficient access to lithium ions dispersed within the silicate mineral particles.

In an embodiment, when the silicate mineral is pre-treated by calcination, it may as required thereafter be milled (e.g. in a roller mill) and then separated (e.g. in a cyclone) from a resultant hot gas stream, prior to being mixed with the nitric acid.

In an embodiment, as part of the leaching process, the mixture of silicate mineral with nitric acid may be subjected to a digestion process. The digestion process can take place in a digestion reactor that may employ one or more stages, and may be conducted under conditions such that lithium values in the silicate mineral are converted to soluble lithium nitrates. The digestion process conditions may be controlled to minimise the quantities of non-lithium values (i.e. that may be present in the silicate mineral) being rendered soluble, hence capable of being leached from the silicate mineral (e.g. non-lithium values such as aluminium, iron and other transition metals including nickel, chromium, manganese and cobalt; the alkaline-earth metals calcium and magnesium; and, the phosphate ion). If leached out, these and some other non-lithium values can still be separated (e.g. precipitated) out of the aqueous phase.

A desired digestion reaction can be expressed as:

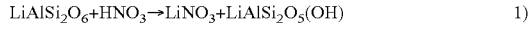  1)

Spodumene Nitric acid Lithium nitrate Pyrophyllite

In one embodiment, the leaching (e.g. digestion) process conditions may comprise increasing the pressure and temperature of the leaching process so as to accelerate leaching of lithium values and their conversion to lithium nitrates. For example, the silicate mineral and nitric acid may be reacted together at elevated temperatures (e.g. ~170° C.) and elevated pressures (e.g. ~15 Bar pressure), e.g. in a digestion reactor, such as an autoclave. It has been shown, for example, that it is possible to extract 95% of the lithium in a sample of calcined (β) spodumene under pressure in such a reactor at a temperature of ~170° C. in under an hour.

In another embodiment, the silicate mineral and nitric acid may be reacted together at elevated temperatures (e.g. ~100° C.-120° C.) but at atmospheric pressures. Such a reaction may also take place in a digestion reactor, but in this case not a pressure vessel.

In an embodiment, the digestion process conditions may comprise reacting the silicate mineral with a stoichiometric excess of nitric acid to ensure maximum extraction of the lithium from the silicate mineral. The time period allowed for digestion, and the concentration of the nitric acid, may be separately controlled to help maximise the extraction of lithium values from the silicate mineral, while minimising the extraction of impurity metals and anions present in the lithium-rich silicate mineral, including the aforementioned aluminium, iron, other transition and alkaline earth metals (calcium and magnesium), and the phosphate ion.

In an embodiment, an excess of nitric acid (when in liquid form) and water remaining after the digestion process is deemed to be complete, may be distilled off in a drying stage. The drying stage may also represent a continuation of the digestion process, which may first be initiated in a separate mixing vessel/stage.

The drying stage may employ a hollow-flite screw conveyor (e.g. the Therma-Flite Holo-Scru™, the Bepex Thermascrew™ or the Metso Holo-Flite™). A benefit of resorting to hollow-flite screw reactors for the digestion process is that molten salts, preferably blends of alkali-metal (lithium, sodium and potassium) nitrates and that may also include some alkali-metal nitrites, may be circulated through the hollow flites at temperatures (depending on the composition of the blend) at which they will remain in a molten or liquid state. These temperatures may range (depending on the composition of the blend) from below ~100° C. to more than ~500° C. Significantly, such mixtures of heat-transfer salts can be a by-product of this total process, as will be described below. Such mixtures of heat-transfer salts may also be in demand for use as media for thermal energy storage and transfer in inter alia, concentrated solar power (CSP) plants.

In one embodiment, the reactor(s) employed in the drying stage may be fully enclosed, and may be operated under slight negative pressure (relative to atmospheric pressure) to prevent the emission of oxides of nitrogen and nitric acid vapours.

In another embodiment, the reactor(s) employed in the drying stage may be operated at elevated pressures, for example, ~10 Bar to ~15 Bar. This can match the pressures under which the upstream (prior) digestion process may have been carried out.

As set forth below, in the drying stage the nitric acid and water vapours, and NOx gases may be allowed to circulate internally, while any surplus quantities of these may be collected for use in regenerating nitric acid. In this regard, in an embodiment, a solution of nitric acid may be produced in a dedicated nitric acid production plant, which acid may then be reused in the leaching process—i.e. for digesting additional calcined spodumene or other lithium-rich mineral silicate.

As set forth above, the lithium values in the treated, ready-to-be-leached silicate mineral may be efficiently converted to nitrates using nitric acid that is in vapour (precursor) form, together with NOx, oxygen (e.g. in air), and water vapour. Thus, in an embodiment, the digestion process conditions may be controlled to favour such gas-solid phase conditions. In this embodiment, pressures within the digestion reactor may be set at approximately atmospheric, but temperatures may be set at levels above the boiling point of any of the liquid phases (nitric acid, water) such that all reactants in contact with the silicate mineral are in gas- or vapour-phase, for example, from ~170° C. to ~200° C.

In an embodiment, a source of such precursor gases may comprise a subsequent reactor in the process, as described below, being a reactor in which lithium nitrate crystals are decomposed thermally to lithium oxide (solid), and oxides of nitrogen (NOx) and oxygen (both gases). In this embodiment, some or all of these gases may by-pass a nitric acid plant and instead be passed directly to the digestion reactor.

A digestion reaction in this case can be expressed as:

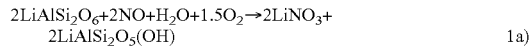

$$2LiAlSi_2O_6 + 2NO + H_2O + 1.5O_2 \rightarrow 2LiNO_3 + 2LiAlSi_2O_5(OH) \qquad 1a)$$

Digestion reactors in the form of the afore-mentioned hollow-flite screw conveyors, whether operated at atmospheric or at elevated pressures, and with the capability to circulate blends of alkali-metal nitrates (perhaps including some alkali-metal nitrites) through their hollow conveyor flites, can enable the various afore-mentioned embodiments of the digestion process.

In an embodiment, the partially cooled solids from the mineral calcination stage, e.g. at a temperature of ~400° C., may be conveyed directly to the inlet of the hollow-flite reactor. Once in this reactor, which as set forth above may be operated at atmospheric pressures or elevated pressures, a blend of nitric acid as a liquid, and/or as a vapour, oxides of nitrogen (NOx), oxygen and water vapour (which are inter alia by-products of the lithium nitrate decomposition process) together with some air (a source of additional oxygen), can be brought into contact with the still-hot silicate mineral solids within the reactor. There, they may react with the silicate mineral, to convert the lithium values in the latter to lithium nitrate and perhaps some lithium nitrite. These reactions are exothermic, so the molten nitrate/nitrite salt mix circulating through the hollow flites is such as to fulfil a cooling role, to convey away surplus heat of reaction in order to keep the temperature of the digesting solids mass to a temperature, typically below ~200° C. As a result, the circulating molten salt blend will be heated.

In an embodiment, the molten salt blend may be further heated to around 400° C. in the course of cooling the hot, calcined, e.g. activated (β) spodumene or the like from the calciner. The total detention time of solids (calcined mineral) in the digestion reactor may range from several minutes to several hours or even longer, depending upon the temperatures and pressures employed and the design of the reactor.

In an embodiment, at a practical conclusion of the digestion process, further reactions between the nitric acid lixiviant and the calcined spodumene can be terminated. A number of alternative processes/stages may be employed to bring about this termination, each of which may represent a distinct embodiment of the total process as set forth herein.

In an embodiment, termination of the main digestion reaction may be achieved by neutralisation alone. Where an aqueous-phase leaching solution (i.e. a solution used to slurry the product of the digestion reactor), is made, such as by adding water to the products of the digestion reaction, this water becomes a strongly acidic aqueous phase, i.e. due to the presence of residual free (un-reacted surplus) nitric acid. In this embodiment the aqueous-phase leaching solution can contain enough suitable alkali to ensure that the pH of this aqueous phase remains neutral to slightly alkaline throughout the neutralisation process. In this embodiment, the suitable alkali may be one or more of the alkaline lithium compounds (e.g. one or more of lithium hydroxide or lithium carbonate: LiOH and $Li_2CO_3$ respectively) that are produced in the course of the total process as set forth herein.

Advantageous outcomes of the pre-emptive neutralisation of this residual acidity by lithium hydroxide can include the conversion of free surplus nitric acid to more lithium nitrate, as well as the conversion of any nitrates of aluminium, iron and other transition metals and alkaline earth metals to their insoluble oxide or hydroxide forms. The inventor has surprisingly discovered that when, for example, lithium hydroxide is used as the alkali for maintaining such pH-neutral to mildly alkaline conditions in the aqueous phase, not only are aluminium and transition-metal values that have entered solution, precipitated (as insoluble oxides or hydroxides), but magnesium values that have entered solution are also precipitated as insoluble magnesium hydroxide. In an embodiment, calcium values present in the aqueous phase may also be precipitated as insoluble calcium carbonate (calcite or aragonite), by the addition of appropriate quantities of alkali metal carbonates, such as lithium carbonate. Advantageously, the lithium cations added can also form more lithium nitrate.

Suitable equipment for conducting the neutralisation reaction may include simple covered tanks (there may be just one, or there may be two or more tanks operated in series). Each tank may be fitted with an agitator and/or other means e.g. an air-sparging system, to maintain any insoluble solids in suspension. An extended mixing time (e.g. many hours) may be required. This is firstly, because the reactions, e.g. wherein the nitrates of aluminium in particular hydrolyse to form aluminium hydroxide, are best conducted slowly, so that the resulting aluminium hydroxide particles are discrete and crystalline (rather than gel-like) and have favourable settling, filtering and washing properties. This can allow such particles to be processed and removed in typical solids-liquids separation equipment and systems.

In an embodiment, air may be sparged and dispersed in a controlled manner through the slurry that is passing through the neutralization tanks. Oxygen in the air can convert (oxidise) any nitrite ions formed during the digestion process to nitrate ions, which can also facilitate downstream processes intended for the further purification of lithium nitrate.

In another embodiment (such as when digestion is performed with nitric acid supplied to the digestion reactor in liquid form), instead of relying solely on neutralising all of the residual nitric acid using alkaline intermediates such as lithium hydroxide and optionally lithium carbonate, the leaching process may be substantially terminated, and much of the excess nitric acid recovered, by non-chemical means. In this embodiment the product of the digestion process, while still a substantially solid mass leaving the digestion reactor, and prior to any attempts to slurry it with an alkaline aqueous solution, may first be heated so as to distil off volatiles, which can include as vapours the excess of nitric acid, along with any free water present.

In this embodiment, the dried solids mass from the digestion reactor may then be further heated to a temperature approaching ~200° C., i.e. sufficient to decompose aluminium, iron and other transition-metal nitrates to their respective insoluble oxides or hydroxides. This heating can also release further oxides of nitrogen (NOx) and oxygen, which can be captured and transferred to join with the nitric acid vapour and water vapour produced in the drying stage.

In this embodiment, this heating may be carried out in a downstream section of the digestion reactor, with the resultant vapours being recycled directly to an upstream section of the digestion reactor. This can reduce the quantity of nitric acid that needs to be blended with the calcined silicate mineral fed to the digestion reactor (or nitric acid otherwise fed to the digestion reactor), to the extent that these vapours can function in the same way that nitric acid does (whether in liquid or vapour form). This is, these recycled vapours can convert lithium values in the silicate mineral to soluble lithium nitrate (and e.g. some nitrite). In this embodiment, while most of the residual nitric acid and oxides of nitrogen from the decomposition of aluminium and transition-metal nitrates are removed by boiling them off, it is observed that the residual solids can still contain enough acid-forming materials such that the aqueous solution used to slurry the solids may be rendered alkaline by, for example, lithium hydroxide and/or lithium carbonate (e.g. by a proportion of recycled downstream product).

However, to the extent that surplus acid-forming volatiles are removed by thermal treatment, the quantity of lithium hydroxide and/or carbonate required to be recycled for this purpose can be reduced, as will, therefore, the additional quantity of lithium nitrate passing to subsequent processing steps.

In this embodiment, by converting the aluminium, iron and transition-metal ions, and also magnesium and calcium ions that may be present in the solids from the digestion process (i.e. as soluble nitrates), into insoluble products (hydroxides and carbonates), these insoluble products simply add to the residual solids material that remains after the leaching stage. Hence, these materials may be readily separated from the aqueous phase along with the other insolubles. In contrast, the lithium values can remain in a soluble form such that, in a subsequent stage, they can be readily extracted into (e.g. alkaline) aqueous solution.

Thus, while the calcined silicate material can be reacted with nitric acid, oxygen, water vapour and oxides of nitrogen entirely in vapour phase, in other embodiments (including but not necessarily limited to those summarised above), different termination options may be employed as appropriate under particular conditions and circumstances.

In the various process embodiments, surplus nitric acid and water vapours, together with oxides of nitrogen and some oxygen from the decomposition of the nitrates of aluminium, iron and other transition metals, may be collected for use in regenerating nitric acid (e.g. a solution of nitric acid can be produced in a dedicated nitric acid production plant, which acid may then be reused in the process).

In the various process embodiments, the product of the aforementioned stages can be a hot, concentrated aqueous solution of lithium nitrate. This solution may also contain small quantities of the nitrates of the alkali metals sodium and potassium. This solution may be further processed in the course of converting the contained lithium values to the desired chemicals including lithium hydroxide, lithium carbonate and lithium metal. Two alternative embodiments may be employed.

In a first such embodiment, the entire concentrated solution of lithium nitrate may be progressively heated in a sequence of operations, ultimately to a temperature in the order of ~750° C. Whether a single item of plant and equipment, or a series of items of plant and equipment, is used to achieve this heating, the lithium nitrate solution undergoes three changes. Firstly, it is evaporated to dryness, with water distilled off. Secondly, with further heating to above ~260° C., the solid crystalline mass of lithium nitrate is caused to melt and become a mobile liquid. Thirdly, with heating of this liquid to above 600° C., the lithium nitrate is caused to decompose to lithium oxide (lithia), with the emission of oxides of nitrogen (NOx) and some oxygen.

The first and second stages of heating (i.e. to above ~260° C. and typically to around 400° C.) may be carried out within any of a range of commercially available items of equipment, for example, an insulated, covered tank or series of similar tanks, each fitted with an agitator to maintain solids in suspension. Such tank(s), together, may hold a substantial inventory (e.g. at least one hour's detention time) of molten lithium nitrate at a temperature controlled to around 400° C. The contents of the tank may be maintained at this temperature by being continuously heated by a jacket or by pipes through which are circulated (such as by dedicated pumps and interconnecting piping) a molten salt mixture comprising nitrates and nitrites of the alkali metals lithium, sodium and potassium, which can be a by-product of the lithium nitrate purification process as discussed below. The molten salt mixture in turn, may be heated by circulating it (by way of the same circulation pumps and additional interconnecting piping) through the hot combustion gases exiting from the silicate mineral calciner, through other hot combustion gases from a lithium nitrate roaster, from the hot process gases emanating from the lithium nitrate roaster, and depending on the embodiment, through the digestion reactor. In this stage of heating, residual water contained in the feed may be flashed off as water vapour (which may be directed to join with the water vapour and other volatiles from the prior and subsequent heating stages). Any insoluble solids can be maintained in suspension by the agitators (which may be air-sparging systems) configured with the tank(s).

In a second such embodiment, the process may further comprise a first crystallisation stage. In this stage, the concentrated solution of lithium nitrates from leaching (and any additional downstream purification) may be further concentrated and then crystallised to form a higher-purity crystalline lithium nitrate $LiNO_3$. The first crystallisation stage may employ an evaporator/crystallizer.

The resultant crystallised $LiNO_3$ from the first-stage crystallization (often referred to by those familiar with crystallization as a "First Strike") is typically in slurry form, and the solid lithium nitrate crystals may be separated from the aqueous phase by centrifugation. Then, the solution that is separated from the crystalline $LiNO_3$ may be passed to a second crystallization stage, from which may be obtained as a "Second Strike" of lithium nitrate crystals.

The resultant crystal-rich slurry from the second-strike crystallization may be passed to a dedicated filtering-type centrifuge that may be, essentially, a duplicate of the main lithium nitrate crystal separation centrifuge. This second centrifuge may be operated intermittently, such as by holding the resultant crystal-rich slurry from the second-strike crystallizer in an agitated storage tank. Depending on their purity, the mass of separated crystals may be returned to the feed tank that supplies the primary lithium nitrate crystallizer, where they may be re-dissolved and re-crystallized to join the main lithium nitrate crystal product. However, if sufficiently pure, the lithium nitrates from the second-strike crystallization may simply join the product of the primary (first-strike) crystallizer. In an embodiment, a further, third crystallization stage may be provided, wherein the processes of the second-strike crystallization stage can be repeated. In various embodiments, crystallization systems containing a multiple of crystallization stages operating in series may be employed.

The liquor recovered from centrifugation of the second-strike crystal slurry (or third-strike crystal slurry, should there be one), which by now is relatively enriched in sodium and potassium values, may be treated with the appropriate quantity of a soluble carbonate. In one embodiment, a blend of sodium carbonate (i.e. soda ash) and potassium carbonate in appropriate quantities can be employed. As is known to those skilled in the art, the soda ash (or potassium carbonate) causes the lithium values to precipitate as sparingly soluble lithium carbonate, leaving additional sodium/potassium nitrate in solution.

In an embodiment, the concentrated liquor from the second-strike crystallizer may be held at temperatures in excess of 60° C., and preferably more than 80° C., so as to maximise the precipitation of lithium carbonate, which becomes less soluble in aqueous solutions as temperatures rise.

Further embodiments of the process stages for conversion of the lithium values to pure lithium chemicals (in particular lithium oxide, lithium hydroxide and lithium carbonate) as well as lithium metal, will be set forth hereafter in further, non-limiting detail in the Detailed Description.

Also disclosed herein is a system for recovering lithium from a lithium-containing silicate mineral. The system comprises a leaching reactor in which a mixture of the silicate mineral and nitric acid is subjected to conditions such that lithium values in the silicate mineral are leached from the silicate mineral as lithium nitrate.

The system can further comprise various process apparatus, as set forth above, and as hereafter described in further detail.

BRIEF DESCRIPTION OF THE DRAWINGS

Embodiments of a process and system will now be described with reference to the following drawings, which are exemplary only, and in which.

DETAILED DESCRIPTION OF SPECIFIC EMBODIMENTS

Figure 1:
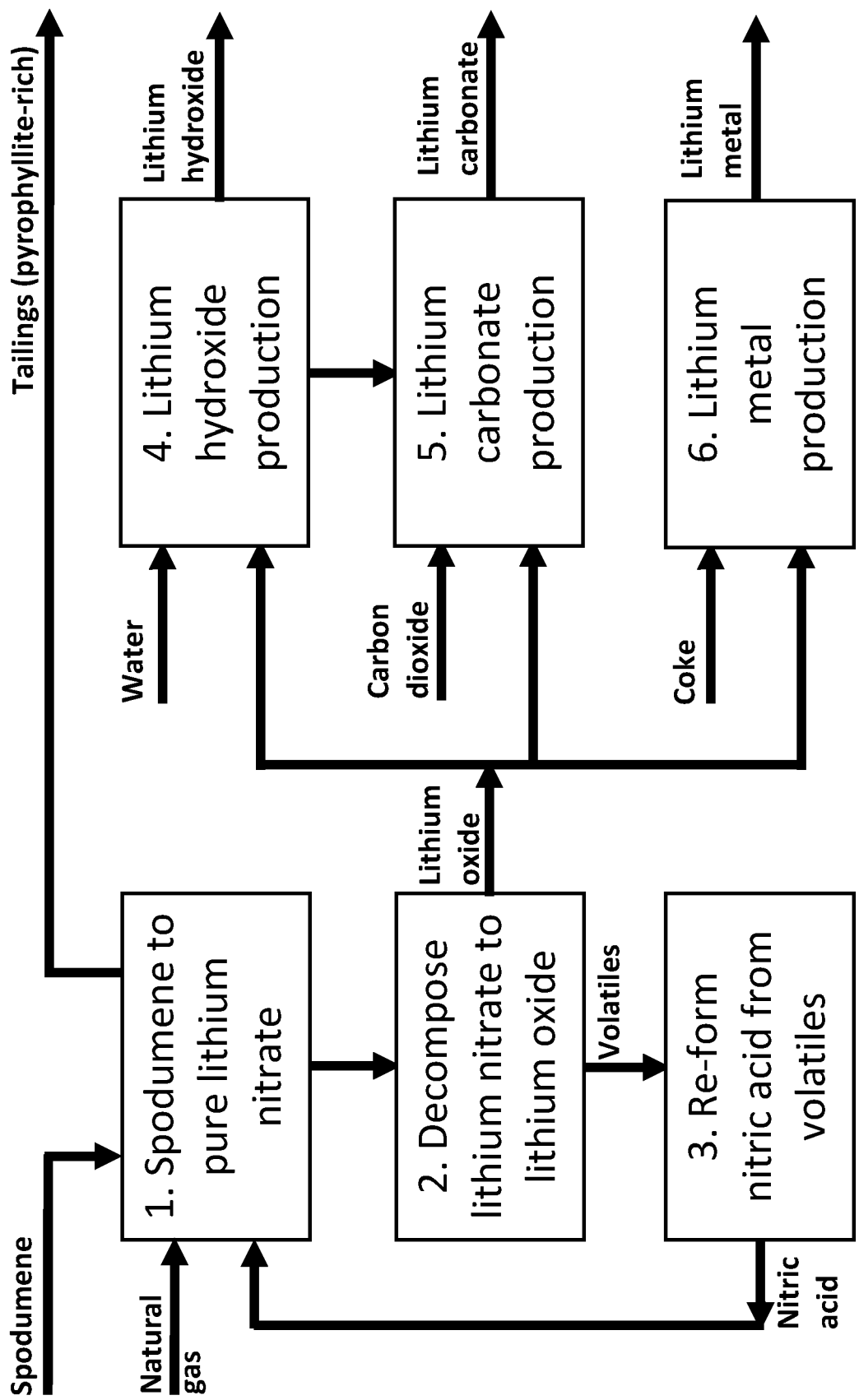
FIG. 1 is a concept diagram of a process and system for recovering lithium, as lithium hydroxide, lithium carbonate and lithium metal, from a lithium-containing silicate mineral.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

The following description discloses an embodiment of a process and system for producing lithium oxide (lithia) from a lithium-containing silicate mineral (e.g. spodumene or other lithium-rich metal silicate ores) using a recyclable nitric acid leach regime. From the important lithia intermediate, lithium hydroxide, lithium carbonate and lithium metal can be produced in varying proportions. The process and system can also capture carbon dioxide from flue gases produced elsewhere in the total process.

FIG. 1 is a concept diagram, set out in simple block diagram form, of a process and system for recovering lithium as lithium hydroxide, lithium carbonate and lithium metal, from a lithium-containing silicate mineral. The total process is divided into what may be up to six 'blocks', as follows:

1. Digestion of e.g. spodumene in nitric acid and production of pure lithium nitrate;
2. Decomposition of lithium nitrate to lithium oxide and oxides of nitrogen;
3. Recovery of off-gases rich in oxides of nitrogen (NOx) from the decomposition of lithium nitrate, and other unit operations, and converting these into nitric acid for re-use in stage 1.
4. Conversion of lithium oxide to lithium hydroxide;
5. Conversion of lithium oxide and/or hydroxide to lithium carbonate;
6. Conversion of lithium oxide to lithium metal.

The following description sets out a range of specific ways of accomplishing the operations required to achieve the outcomes summarised in each of the six blocks.

1. Digestion of e.g. Spodumene in Nitric Acid and Production of Pure Lithium Nitrate.

This block encompasses the following unit operations:

i. Pre-treatment of the lithium-containing mineral concentrate, in the case of spodumene and other hard-rock forms, usually involving calcination (often referred to as decrepitation). This involves heating the mineral to temperatures required to bring about a phase change, namely: the conversion of the dense (specific gravity around 3.2) impermeable (hence highly inert), natural mineral (e.g. a spodumene) to a more open, friable and permeable phase (e.g. β spodumene, specific gravity around 2.4). Typical temperatures required are of the order of 1,000° C.

ii. Partial cooling and possible further size reduction of the calcined mineral (e.g. β spodumene).

iii. Reacting (digesting) the partially cooled e.g. β spodumene with nitric acid, or (in an embodiment) vapours and gases that are the precursors of nitric acid, to convert the lithium values in the calcined e.g. β spodumene to soluble lithium nitrate.

iv. Slurrying the product of the digestion process in a manner that minimises the tendency of surplus free acid to attack other materials in the product of the digestion process.

v. Removing (as necessary, in light of the purity of the lithium nitrate-rich aqueous phase obtained in iv.) other elements and ions that the nitric acid has also rendered soluble, by converting them to nitrates, and by precipitating them as insoluble solids, to be removed along with the values in the calcined e.g. spodumene that remained insoluble during the (nitric acid) digestion process. During this process, nitrite ions present may be oxidised to nitrate ions by sparging oxygen (preferably, in the form of air) through the slurry.

vi. Separating, by familiar solids-liquids separation techniques (e.g. filtration), the soluble, lithium-rich aqueous phase from the insoluble residues of the digestion process, including precipitates formed in solution purification steps undertaken in iv. and v.), and washing the insoluble-solids residue (e.g. filter cake).

vii. Producing pure lithium nitrate: either as a medium-purity product by evaporating to dryness the solution from vi. or, to obtain a high-purity product, by evaporating and then crystallising lithium nitrate, separating out (e.g. by centrifuge) the lithium nitrate crystals, repeating the process to produce more lithium nitrate crystals (e.g. in a multiple-effect crystallizer), leaving a concentrated solution of alkali metal nitrates (i.e. of lithium, along with nitrates of sodium and potassium).

viii. Recovering some of the lithium values remaining in the residual centrifuge filtrate/centrate, by treating the filtrate/centrate with an alkali metal carbonate (e.g. sodium carbonate or potassium carbonate), then filtering and washing the lithium carbonate precipitate. This precipitate can be of adequate purity to be marketed. The residue, a blend of lithium, sodium and potassium nitrates may be marketed inter alia to the operators of concentrated solar power (CSP) stations employing molten-salt energy storage systems.

Each of the tasks i. to viii. may be carried out under a range of conditions, using a range of suitable plant and equipment available on a commercial basis from specialist suppliers. A number of possible approaches are outlined in the following description. The different approaches described are not exhaustive; other approaches, i.e. further variations on a theme, may be adopted by a person of ordinary skill in the art to achieve the desired ends.

2. Decomposition of Lithium Nitrate to Lithium Oxide and Oxides of Nitrogen.

The solid crystallised lithium nitrate that is separated from the solution may be subjected to thermal treatment, for example, by heating it to temperatures that cause decomposition of the lithium nitrate into solid lithium oxide (lithia, $Li_2O$) i.e. to temperatures above ~600° C. During this thermal decomposition, a gaseous/vapour stream which includes oxides of nitrogen plus some oxygen can be produced. This stream can be passed to the nitric acid production plant to produce nitric acid for use in the process. In another embodiment, some or all of this stream may be returned directly to the digestion reactor. The decomposition reaction at these elevated temperatures can be expressed as follows:

$$4LiNO_3 \rightarrow 2Li_2O + 4NO + 3O_2 \qquad 2)$$

Lithium Nitrate   Lithia   Nitric Oxide   Oxygen

The thermal treatment can employ a roaster, but it is important that the contents of the roaster (the lithium nitrate and lithium oxide being formed from the decomposition of the former) are not exposed either to significant quantities of water vapour or carbon dioxide, both of which can react with lithium oxide to form in the first instance lithium hydroxide, and in the second instance, lithium carbonate, even at the high temperatures at which the decomposition process operates.

In an embodiment, the roaster can be an indirect-fired rotary kiln (e.g. jacketed). In this regard, the contents as they pass through the rotary kiln are heated externally, by for example, the combustion of natural gas in air (the hot combustion gases passing through the jacket). The heat from this combustion heats the contents passing through the kiln by conduction through the walls of the kiln.

In an embodiment, the walls of the kiln can be made of a heat-resistant stainless steel, for example Type 310, or other nickel-rich stainless steel, or even an alloy that is primarily nickel (including members of the Inconel family). In this embodiment, neither the natural gas, the air provided for its combustion, nor the products of combustion, principally nitrogen, some oxygen, carbon dioxide and water vapour, at any time come into contact with the lithium nitrate and lithium oxide contents passing through the kiln. In an embodiment, the hot flue gases, at temperatures likely to exceed ~700° C., are cooled by passing them through a suitable convective heat exchanger, across tubes through which a molten salt comprised of a blend of alkali-metal nitrates (plus some nitrites) is circulated. In this way, the off-gases may be cooled to below ~200° C.

An issue to be addressed is that not all of the active nitrogen present in the lithium nitrate feed will be converted to oxides of nitrogen NO, in that some can be converted to inactive forms of nitrogen including nitrogen gas $N_2$, while there may also be some formation of nitrous oxide $N_2O$. To the extent both of these gases are produced, instead of nitric oxide, there will be a loss of active nitrogen from the total system (i.e. the nitrogen which may be conveniently converted back to nitric acid, or which may even be used directly in the digestion process). The resulting losses of active nitrogen, plus other losses of active nitrogen that may occur elsewhere in the entire process, can be made up.

The process envisages two embodiments by which these losses may be made up.

In one embodiment, an appropriate quantity of anhydrous ammonia can be fired in an excess of air in the presence of a suitable catalyst, such as a platinum-rhodium matrix or mesh, using equipment familiar to those skilled in the art of nitric acid manufacture by the Ostwald Process. The combustion of ammonia in air in the presence of such a suitable catalyst has the advantage of producing additional oxides of nitrogen (rather than nitrogen gas) according to the following equation:

$$4NH_3 + 5O_2 \rightarrow 4NO + 6H_2O \qquad 3)$$

This reaction produces no carbon dioxide, but it does produce water vapour. However, since the nitrogen make-up quantities required will be small, and some water vapour is required for the production of nitric acid, this water vapour is an acceptable constituent of the total gases that will pass through the kiln. Implied is that the combustion products of this reaction 3) can come into direct contact with the solids passing through the decomposition kiln.

In another embodiment, suitable where electricity prices are low, the active nitrogen may be made up by drawing on a process invented more than a century ago and known now as the Birkeland-Eyde Process, wherein air is passed through an electric arc, where it may be heated to temperatures approaching or even exceeding ~2,000° C. At such temperatures some of the oxygen and nitrogen in the air may combine according to the following equation:

$$N_2 + O_2 \rightarrow 2NO \qquad 4)$$

Since the reaction is reversible it is important that the gases after their rapid heating, are flash cooled as rapidly as possible. In an embodiment, the hot gases from the electric arc can be immediately quenched by the much cooler (albeit at temperatures exceeding ~700° C.) air, and other gases and vapours circulating through the roaster.

In both embodiments, the heat content of the product gases can be usefully, and directly, employed for the heating of the material charge passing through the kiln, thereby conserving some of the natural gas otherwise required to provide the essential heat energy, noting that the decomposition of lithium nitrate is highly endothermic.

3. Recovery of Off-Gases Rich in Oxides of Nitrogen (NOx) and Conversion to Nitric Acid.

In both of the embodiments set forth in 2., some or all of the oxides of nitrogen that appear on the right-hand side of reactions 2) and 3), or 2) and 4), can be passed directly to the digestion reactor. To the extent that oxides of nitrogen alone (along with some water vapour and atmospheric oxygen) are not efficient at converting lithium values in the calcined e.g.

spodumene to soluble lithium nitrate, the oxides of nitrogen can be passed to the nitric acid production plant, where they can contribute to the production of additional nitric acid, to the point where losses of nitric acid that inevitably occur as it is recycled in the overall process are made up in part, if not in full. Here, it can be seen that the combustion of ammonia to fuel the lithium nitrate decomposition process can add to the production of nitric acid for use in leaching of the silicate mineral, as may the electrical energy required to force the combination of atmospheric oxygen and nitrogen.

In an embodiment, the nitric acid plant can take the form of a conventional Ostwald Process plant, or at least those sections of an Ostwald Process plant that involve the conversion of nitric oxide to higher oxides of nitrogen, in particular nitrogen dioxide, and then to absorption towers where the following reactions occur:

$$2NO + O_2 \rightarrow 2NO_2 \qquad 5)$$

$$3NO_2 + H_2O \rightarrow 2HNO_3 + NO \qquad 6)$$

The NO produced in reaction 6), then reacts with surplus oxygen (from air) as per the first reaction.

At this point, the singular product of the overall (total) process is pure lithium oxide (lithia), which is made in such a way that the key chemical involved, nitric acid, does not have to be purchased, and losses (as are inevitable in closed processes) are made up on site; either by the catalytic combustion in air of small quantities of ammonia, or the electric arc heating of air to combine oxygen and nitrogen.

The subsequent blocks of FIG. 1, i.e. those numbered 4, 5 and 6 represent stages of the total process dedicated to the conversion of lithium oxide to commercially valuable products: lithium hydroxide, lithium carbonate, and lithium metal respectively. However, it is to be understood that many other valuable lithium chemicals including lithium halides (fluoride, chloride, bromide, iodide) can also be produced starting with lithium oxide, in ways familiar to those skilled in the art.

4. Conversion of Lithium Oxide to Lithium Hydroxide.

To convert lithia to lithium hydroxide, the process can further comprise a slaking stage. In this stage, a controlled amount of typically pure water (such as distilled water or demineralised water) can be added to the lithium oxide ($Li_2O$) produced in Block stage 2. The amount added can be sufficient to convert the $Li_2O$ to lithium hydroxide (LiOH), and to cause all of the LiOH to dissolve into solution.

In this embodiment, the resultant solution from the slaking stage (i.e. that comprises LiOH in a near-saturated solution), can be subjected to a crystallization stage. In this stage, the solution of lithium hydroxide can be concentrated by thermal evaporation and crystallised to form pure crystalline lithium hydroxide monohydrate ($LiOH \cdot H_2O$). This can form one product of the process.

In an embodiment, the crystals of $LiOH \cdot H_2O$ can be separated from solution, such as by centrifugation. The separated crystallised $LiOH \cdot H_2O$ can be further processed as required. This further processing can comprise (a) drying the crystals and optionally milling them to a specified particle size. The further processing can also comprise (b) further heating the dried crystals under reduced pressure conditions to a temperature of at least 180° C. This can drive off the water of crystallization to create thereby an anhydrous lithium hydroxide product of the process. The water vapour that is distilled off can be collected and condensed to produce additional pure process water for use elsewhere in the total process.

In an embodiment, the heating medium for the concentration and crystallisation of lithium hydroxide monohydrate, and (if required) the dewatering and removal of water of crystallization of the crystallized lithium hydroxide monohydrate, can be molten lithium and other alkali metal nitrates, such as that produced as described above and hereafter.

In an embodiment, the lithium hydroxide solution that is separated from the crystalline $LiOH \cdot H_2O$ can be divided such that a first proportion of the solution can be recycled to Block stage 1., for use in terminating the reaction of the silicate mineral with the nitric acid (i.e. to neutralise residual nitric acid that has not been consumed in the digestion stage). As heretofore described, this terminates the reaction of the silicate mineral with the nitric acid. Such recycle is resorted to whether or not there has been a preliminary heating step in which excess nitric acid contained in the product of the digestion reactor is neutralised directly, or is first heated to the point where most of the volatiles (including nitric acid and water) are distilled off. As heretofore described, the quantity of lithium hydroxide recycled can be substantially less if much of the free nitric acid is distilled off prior to this neutralisation step.

5. Conversion of Lithium Oxide/Hydroxide to Lithium Carbonate.

The convert the lithium oxide/hydroxide to lithium carbonate, a second portion can be divided from the separated lithium hydroxide solution and reacted with carbon dioxide. In an embodiment, this second portion of lithium hydroxide solution can be used to scrub carbon dioxide from a flue gas that is produced during Block stage 1., i.e. during pretreatment (e.g. calcination) of the lithium-containing silicate mineral, and prior to contacting the mineral with nitric acid. Additionally or alternatively, the second portion of lithium hydroxide solution can be used to scrub carbon dioxide from the flue gas of the natural gas-fired indirect kiln used for the decomposition of lithium nitrate.

In this embodiment, scrubbing carbon dioxide from the flue gases using the lithium hydroxide solution can produce a lithium carbonate-rich stream. A proportion of this can be lithium carbonate in solid form, specifically, as fine crystals. The solid lithium carbonate can be separated from the stream as a lithium carbonate product of the total process. For example, the lithium carbonate in solid form can be classified and the coarser fraction concentrated (e.g. using a hydrocylone) and then separated e.g. by using a centrifuge of the solid-bowl decanter type, or rotary vacuum-drum filter or horizontal belt vacuum filter. A coarser fraction of the classified and separated solid lithium carbonate, after washing and drying, can form the desired lithium carbonate product of the total process. A finer fraction can be recycled for reuse in the scrubbing of the carbon dioxide from the flue, etc. gases.

Thus, the total process as disclosed herein also makes use of a lithium hydroxide-lithium carbonate system. Lithium hydroxide is moderately soluble in water, with the resultant solution having a strong affinity for carbon dioxide. The lithium hydroxide is able to react with the carbon dioxide to form lithium carbonate. On the other hand, lithium carbonate is sparingly soluble in water. Thus, when a relatively concentrated solution of lithium hydroxide is brought into contact with a gas stream containing carbon dioxide, the lithium carbonate that is formed, and that exceeds its solubility under the prevailing conditions, will precipitate as crystals from the solution. The conditions under which this reaction can occur include temperatures in the system above those at which the meta-stable salt lithium bicarbonate can form, namely, solution temperatures above 60° C. Hence, the flue gas scrubber is typically operated at temperatures above this solution temperature.

6. Conversion of Lithium Oxide to Lithium Metal.

Lithium oxide, which advantageously and uniquely is produced directly in the process, can be conveniently converted to lithium metal such as by a process of carbothermal reduction. The inventor has, significantly, realised that equipment and systems that have been developed for the production of magnesium metal from magnesium oxide by carbothermal reduction can be adapted to the production of lithium metal. This, in itself, is an important and potentially highly valuable innovation, insofar as existing methods in existence for the production of lithium metal are highly complex and expensive, relying on the electrolysis of a molten mix of highly purified, anhydrous lithium and potassium chlorides at temperatures of around ~450° C. The production of the principal feed to such existing methods (i.e. high-purity, anhydrous lithium chloride) also involves complex processing.

Carbothermal reduction processes are the basis for the production of many important metals notably iron and steel, but also manganese, ferrosilicon, pure silicon and (indirectly) magnesium metal. For example, the Kroll process (which uses magnesium metal as reductant) in titanium metal production.

As above, the inventor has, significantly, realised that lithium oxide can be reduced directly to lithium metal by applying technology developed originally for magnesium metal production by a direct carbothermal process. One such example is set forth in U.S. Pat. No. 9,090,954. U.S. Pat. No. 9,090,954 discloses a process whereby a blend of magnesium oxide and carbon in some form (e.g. graphite, petroleum coke or coke derived from coal) is formed into briquettes, which are in turn heated electrically in a furnace (which may employ either induction or electric arc heating) to temperatures that can approach ~2,000° C. This initiates a reversible reaction wherein the magnesium oxide is reduced to magnesium metal, and the carbon is oxidised to carbon monoxide, according to the following equation:

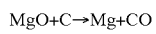

$$MgO+C \rightarrow Mg+CO \qquad 7)$$

In order to prevent the reaction from reversing (proceeding from right to left), the hot vapours (magnesium vapour and carbon monoxide) are flash-cooled by expanding them supersonically through a convergent-divergent nozzle, whereby cooling is effected so rapidly by way of expansion of the gases that the reverse reaction cannot occur to any significant extent. The process described in U.S. Pat. No. 9,090,954 defines a facility for ensuring that the nozzle remains sufficiently hot, so that no impurities are able to condense and accrete on its exposed surfaces, risking a deterioration of performance of the nozzle and even blockages.

With pure lithium oxide (which is inherently produced in the total process) and by resorting only to forms of carbon that are essentially devoid of mineral matter (e.g. certain grades of petroleum coke, or coke made from coal having naturally low ash levels, or coal that has first had its ash content chemically removed (ultra-clean coal)), the present process can resort to earlier art, for example, the procedure of Hori, including as set forth in U.S. Pat. Nos. 4,147,534 and 4,200,264. These processes involve similar apparatus to U.S. Pat. No. 9,090,954, but without the features for ensuring that the nozzle remains adequately heated.

However, in the case of the carbothermal production of lithium metal by the means of U.S. Pat. Nos. 4,147,534 and 4,200,264, the inventor notes that there should be insufficient condensable mineral matter passing through the nozzle and prone to condense and accrete on its exposed surfaces, so that the risk of degraded nozzle performance should be minimal. Conveniently, lithium metal remains in liquid form throughout an extended temperature range, including under the conditions prevailing at the nozzle exit. This facilitates the rapid separation of lithium metal from the current of carbon monoxide gas. In an embodiment, this rapid separation can occur by employing one or more cyclone separators. In an embodiment, the carbon monoxide gas produced by the direct carbothermal process can itself be used as fuel, including as a partial substitute for natural gas to be used for the calcination of the lithium-containing silicate mineral (i.e. in Block stage 1.).

The process and system as disclosed herein will now be described in further and more specific, but non-limiting, detail with reference to FIGS. 2, 3A and 3B. However, it should be understood that as described in the Summary section, the individual unit operations of the process may be varied by way of adopting alternative embodiments explored there; these are variations that are not to be interpreted as being mutually exclusive, in that aspects of one can be applied to others, or may be combined, etc.

Figure 2:
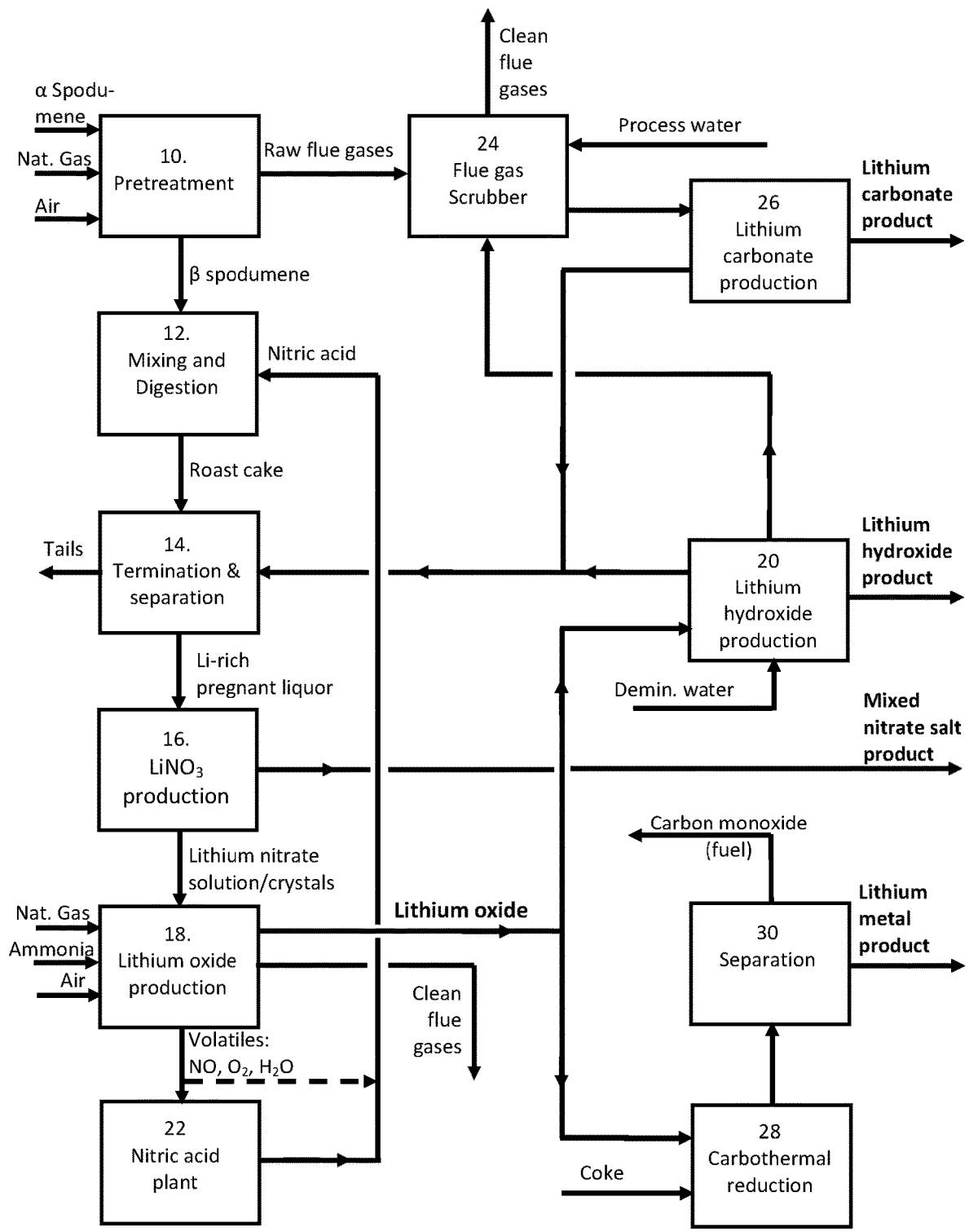
FIG. 2 is a block diagram of the generalised process, showing the major unit operations that may be involved.

However, referring firstly to the block diagram FIG. 2, which sets out a generalised embodiment of the process and system (i.e. that covers most process variations) the process and system can be seen to comprise the following stages:

Pre-Treatment Stage 10 (FIG. 2)

In this stage, illustrated by the reference numeral 10 in FIG. 2, the silicate mineral is pre-treated to produce a treated (e.g. activated) silicate mineral.

For example, the pre-treatment stage can be employed to convert an α (alpha) form of the mineral (e.g. α-spodumene) to a β (beta) form of the mineral (e.g. β-spodumene). Usually the pre-treatment stage comprises a thermal pre-treatment step, but it can solely comprise a non-thermal (e.g. mechanical) pre-treatment step.

When the pre-treatment stage comprises thermal pre-treatment, the step of thermally treating the silicate mineral can bring about a thermal phase transition in, and/or removal of a volatile fraction of, the silicate mineral. The thermal treatment step can be undertaken in a first reactor such as a calciner.

When the thermal pre-treatment step comprises calcination, this is typically undertaken in the presence of air or oxygen, but at temperatures below the melting point of any of the constituents of the silicate mineral. The calcination can be undertaken in a variety of calciners such as: a rotary kiln, a fluidised bed calciner, a flash calciner, a transport calciner, or other suitable apparatus generally familiar to persons skilled in the high-temperature processing of mineral materials.

The thermal pre-treatment stage is operated to increase the temperature of the silicate mineral to well above ambient temperature. For example, the thermal pre-treatment stage can increase the temperature of the silicate mineral to at least about 1000° C. or 1100° C. The maximum temperature of the thermal treatment step will be limited, as understood by a skilled person, to a temperature that does not risk vitrification of solids, making them resistant to leaching. For example, a calcination temperature around 1,050° C. is required for the 'decrepitation' of α-spodumene to the more reactive β-form.

Once thermally treated, the silicate mineral is in a more reactive (e.g. β-) form. The more reactive form is, accordingly, more susceptible to chemical attack, including by acids including acid-forming gases either in the absence or in the presence of water.

The thermal treatment step can, as an option, comprise an additional non-thermal treatment step that follows thermal treatment. For example, this may involve fine or even ultrafine grinding. The additional fine grinding can be performed in a roller mill to cause the silicate mineral to be in particulate form. The particulate nature of the treated silicate mineral can provide for a greater surface area for subsequent reaction. The size of the particles following grinding can be less than about 300, 200, 100 or 70 microns or even finer. The optimal size distribution can be determined on a case-by-case basis.

Mixing and Digestion Stage 12 (FIG. 2)

In this stage, illustrated by the reference numeral 12 in FIG. 2, the pre-treated silicate mineral (β-spodumene in FIG. 1) is mixed with a mineral acid, in this case nitric acid ("Nitric acid" in FIG. 2). The nitric acid can be produced by an on-site nitric acid production plant (stage 22 in FIG. 1). The mixing stage 12 can comprise a tank (e.g. one that is continuously stirred) or an in-line mixer, or a pug mill, which is more appropriate when highly concentrated forms of nitric acid are used. In mixing stage 12 silicate mineral is blended into/slurried with an aqueous phase containing the nitric acid. The resultant mixture/blend can take the form of a solution, slurry or paste.

For example, calcined β-spodumene solids can be slurried with concentrated nitric acid (at least 50%, or even better, 68% and as concentrated as 90% acid, i.e. "red fuming" nitric acid) from the nitric acid plant, to achieve the appropriate form of paste, e.g. containing ~60-70 wt. % insoluble solids (i.e. of the calcined β-spodumene). The quantity of nitric acid added is sufficient to convert all of the lithium in the spodumene to lithium nitrate (stoichiometric quantity); the excess can be as much as 25% or even 75% again of the stoichiometric quantity.

In an embodiment, the hot calcined spodumene product from the calciner is partially cooled by transferring some of its sensible heat to the air destined for supporting combustion of the fuel (preferably natural gas), the means by which the required high temperatures (around ~1,050° C.) are obtained in the calciner. The sensible heat contained in the partially-cooled calcined spodumene (this may be at a temperature of as low as ~200° C., or as much as ~400° C., particularly if gas-solid phase reactions as described above are adopted) serves to heat the nitric acid-spodumene mix to the desired initial temperature for commencing the digestion process.

Depending on whether digestion is conducted under pressure, the pressure of the paste leaving the mixing stage 12 may be raised by way of a positive-displacement pump (e.g. a suitably configured Putzmeister™ or equivalent hydraulic piston pump) to the working pressure of the digester/leaching reactor.

The blend of pre-treated silicate mineral and nitric acid ("Slurry/paste") is now subjected to a digestion reaction. The reaction conditions are adjusted so that the mixture rapidly reacts to produce a solid phase comprising, for example, lithium nitrate, some water, and residual mineral solids.

As will be explained in more detail hereafter, the reactor in which the treated silicate mineral is reacted with nitric acid can comprise a digester, which may take the form of a continuous pressure vessel (such as a single or continuous autoclave), or a non-pressure vessel such as a tank or tower (e.g. a vertical hopper or silo reactor). The reactor can also take the form of one or more pipelines, or one, or a series of, stirred and covered un-pressurised or alternatively pressurised vessels, or a number of interconnected and agitated compartments contained within a single pressure vessel, etc.

The particular reactor configuration that is selected from this range, for a particular project, can depend upon the characteristics of the lithium-rich metal silicate ore. A preferred form of reactor is a hollow-flite reactor e.g. a Therma-Flite™ or equal, wherein the paste is conveyed by one or more internal screw conveyors whose flites are hollow, to allow the circulation through them of a suitable heat-transfer medium. In an embodiment, the heat-transfer medium is a mixture of molten alkali-metal (sodium, potassium and lithium) nitrates, which may contain varying quantities of alkali metal (sodium, potassium and lithium) nitrites. Such blends can remain in a stable, molten state over remarkably wide temperature ranges, typically from below ~100° C. to more than 500° C. In an embodiment, these blends of molten salts, which are a natural by-product of the process as described below, are employed as the heat-transfer medium. Hollow-flite reactors allow for the paste of nitric acid and spodumene to be either heated or cooled, allowing for close temperature control throughout the course of the paste through the reactor. The reactions involving the conversion of lithium values in the spodumene (or other lithium-rich metal silicate) to soluble lithium nitrate (and possibly some nitrite) are exothermic, meaning that the reactor is likely to be operated where the molten alkali-metal salts circulating through the hollow flites effect a cooling, or temperature-limiting function.

As set forth above, the reactions can proceed at ambient/atmospheric pressure. Alternatively, the reactions can be conducted at elevated pressures of at least 5 Bar, possibly ~10 Bar and even ~15 Bar. The reactions typically employ elevated temperatures above 100° C. such as ~120° C., possibly 160° C. and even as high as ~200° C., as appropriate for the particular lithium-rich metal silicate ore being leached.

Termination and Solids Separation Stage 14 (FIG. 2)

In the Termination and Separation stage 14 the reaction of nitric acid with residual mineral solids in the "Li-rich slurry" (FIG. 2) is terminated, and solids residues are separated. This serves to minimise the leaching of non-lithium values into the aqueous phase. Non-lithium values present in the silicate mineral can include aluminium, iron, nickel, chromium, manganese, cobalt, calcium, magnesium, sodium, potassium and phosphate ion. However, by adjusting the conditions in the Termination sub-stage, any non-lithium values can be separated (e.g. precipitated, etc) out of the aqueous phase and returned into the solid residue (i.e. to be removed from the process as tailings).

Termination

In one embodiment, the slurry can be neutralized (e.g. by using appropriate portions of the ultimate product(s) of the process/system, including lithium hydroxide and lithium carbonate). The quantity of neutralising solution added to the product stream is controlled to bring the pH conditions to mildly alkaline (i.e. to between pH 8 and pH 11). This promptly causes all acid-leaching activity to cease.

In the Termination sub-stage, in order to minimise the quantity of lithium hydroxide and/or lithium carbonate that needs to be recycled, most of the nitric acid surplus to the quantity consumed in converting lithium values in the lithium-rich ore to lithium nitrate, can first be removed. In an embodiment, this removal occurs by heating and substantially drying the slurry. In an embodiment, this heating is accomplished in the digestion reactor by circulating the mixture of molten alkali metal nitrates through the hollow flites of the digestion reactor. The resultant dried cake from heating can be re-slurried and then neutralized.

Heating the digester product cake and/or neutralizing free acid formed in the cake in the course of slurrying the cake, serves to terminate the leaching of non-lithium values as these actions neutralise or otherwise remove free nitric acid.

Nitric acid is known to form an azeotropic mixture with water, of composition 68% nitric acid and 32% water. Thus, when it is heated in the Termination sub-stage, the mixture boils (i.e. distils) under atmospheric pressures at approximately 120° C. to form a vapour phase. This distilled vapour phase may naturally disperse throughout the enclosed space of the digestion reactor, where it may condense or otherwise contact un-reacted spodumene closer to the feed end of the reactor. There it may react as nitric acid, thereby increasing the total conversion of lithium in spodumene to lithium as soluble nitrate. Remaining nitric acid vapour can be collected and passed to the nitric acid production plant (stage 22 in FIG. 2). It is to be understood that, if higher pressures are used in the digestion reactor (e.g. 5-15 Bar), the temperatures at which these vapour phases form will be higher than those required should atmospheric pressures only be applied (i.e. in accordance with the laws of elevation of boiling points of solutions under elevated pressure conditions).

The heating of the cake that is the product of the digestion process occurs progressively, until temperatures are reached that are sufficient, firstly, to remove by evaporation much of the surplus nitric acid and water to form the vapour phase, and then, secondly, sufficient to decompose any nitrate salts of aluminium, iron and other base metals present as impurities in the metal silicate ore. The heating can produce relatively dry cakes, as most of the liquid nitric acid will have been converted to solid lithium nitrate, while surplus nitric acid and water will have been distilled off as vapour phases.

The neutralising in the Termination sub-stage can take place in a neutralisation vessel, such as a continuously stirred tank reactor, or a series of such reactors. In the neutralisation vessel(s) the slurry can be afforded sufficient time for the neutralisation of excess nitric acid to proceed to completion. The neutralization vessels may also incorporate facilities for the sparging or other dispersion of finely divided air bubbles through the slurry contents. As well as assisting with maintaining solid particles in suspension, the oxygen in the air may assist with the oxidation of any nitrite ions present to nitrate ions. This is desirable in order to maximise recoveries of lithium as nitrate in the subsequent crystallization stage.

In an embodiment, which uses lithium hydroxide and lithium carbonate drawn in appropriate quantities from the product streams (which may be impure intermediate forms of these products), not only are aluminium and other base metal values (in particular, iron) precipitated from solution as insoluble oxides, hydroxide ions present by virtue of the addition of lithium hydroxide will expedite the precipitation of magnesium values present in solution as insoluble magnesium hydroxide, while calcium ions present in solution will be precipitated as insoluble calcium carbonate (calcite or aragonite) by virtue of the addition of lithium carbonate. In this way, the aqueous phase should be almost entirely free of aluminium ions, base metal ions, magnesium and calcium ions, and phosphate ions, leaving only small quantities of sodium and potassium ions as impurities accompanying the lithium ions that represent the vast majority of the cations in the aqueous phase.

Solids Separation

In the Solids Separation sub-stage lithium nitrate in an aqueous phase comprised primarily of a concentrated lithium nitrate solution is separated from the slurry wherein the solids are comprised of the insoluble residue of the treated mineral (mostly silica and alumina values, plus cations that have been precipitated in line with the embodiment described in the previous paragraph). The lithium nitrate can subsequently be recovered from solution, such as crystalline $LiNO_3$ in an evaporation/crystallization process within Stage 16 (below).

After the Termination sub-stage (i.e. after neutralising or drying), the Solids Separation sub-stage can separate out, as a clarified solution, the lithium-rich aqueous phase from the now-barren (of lithium values) insoluble mineral residue. The Solids Separation sub-stage employs separation apparatus to separate insoluble solids from the slurry, and to wash these residues to recover any soluble values retained within them, to then produce the barren tailings in solid form that may be safely and permanently emplaced, or, marketed (after further processing as necessary) to third parties who may value their properties.

The solids removal can be by way of a process of counter-current decantation (CCD) followed by filtration, or by way of filtration (including washing of the filter cake) alone, to produce a washed filter cake. One or more stages of CCD thickeners or filters may be used (e.g. plate-and-frame filters, rotary vacuum-drum filters, etc).

In the Solids Separation sub-stage, when the Digestion Stage 12 and subsequent termination and purification operations are all carried out under elevated pressures, plate and frame filter presses fitted with cake wash facilities may be used; the pressure of the feed stream to the filters can be close to the operating pressure of the Digestion stage, thereby avoiding the need to reduce the pressure of this stream via elaborate pressure-reduction equipment. At atmospheric pressures, filters such as rotary vacuum drum filters with cake wash facilities, and horizontal belt filters with cake wash facilities, can be employed. The arrangement eventually selected for removing insoluble solid materials will depend upon the characteristics of the solids present, such as whether or not they are free-draining. The washed filter cake can form a stable residue consisting primarily of silica and alumina, plus certain other insolubles depending upon the composition of the original mineral concentrate, but likely to contain other silicate minerals, iron ore values (chiefly goethite), magnesite, limestone (calcite and aragonite) and ilmenite.

These residual solids may well find markets with third parties who may value some of their potentially unique characteristics. For example, the structure of the tailings residue consists primarily of a mineral where lithium ions have been substantially replaced by hydrogen ions, to yield a mineral with the formula $AlSi_2O_5(OH)$, i.e. it is a partially hydrated aluminium silicate (the mineral pyrophyllite), with the open, micro- and nano-porous structural characteristic of the precursor β-spodumene. Such minerals are members of the zeolite family, which are widely employed for a broad range of applications including water treatment, waste disposal, agricultural and animal feed supplements and as catalysts in many industries. One benefit is that high yields of such minerals may be obtained, possibly representing a positive contribution to the cash flows of lithium ore refineries based upon the disclosed process and system. Other uses for these residues may include as a raw material for the manufacture of Portland cement. As well, quantities of iron oxides or hydrated oxides of alumina present may be sufficient to warrant their separation and beneficiation using methods known to those skilled in such processes.

With the insolubles removed, the soluble lithium cations along with any other soluble cations and the soluble anions primarily nitrate can be collected as a clarified solution for further reaction. The solution can be referred to as clarified or pregnant liquor.

Lithium Nitrate Production Stage 16 (FIG. 2)

In this stage, an intermediate lithium nitrate product is produced. In an embodiment the lithium nitrate can be produced as a high-purity crystalline solid in an evaporation and crystallization sub-stage. In this sub-stage the clarified lithium nitrate solution is further concentrated by evaporation to produce lithium nitrate crystals. In an embodiment this sub-stage can comprise a mechanical vapour recompression mechanism, wherein a vacuum pump lowers the pressure over the contents of the vessel, until such time as the aqueous phase begins to boil. Water vapour is compressed by the vacuum pump and returned as an adiabatically heated vapour to the shell-side of the calandria in the vessel. High-purity condensed water is collected for re-use elsewhere in the process. Lithium nitrate is highly soluble in water, and its solubility increases rapidly as temperature rises. The evaporator/crystalliser thus includes a section where the contents are further slowly cooled (e.g. in a heat exchanger such as a spiral-type, cooled in turn by a coolant fluid such as cooling water, cooled in turn by a fin-fan cooler, or by an evaporative cooling tower), whereupon more lithium nitrate crystallises from solution to form a dense crystal slurry.

This crystal-dense slurry is then passed to apparatus for separating and dewatering the lithium nitrate crystals from the crystalliser slurry, and for returning the largely solids-free lithium nitrate solution to the crystalliser system. Such apparatus can comprise a centrifuge, such as a solid-bowl decanter, screen-bowl decanter, conical-screen or pusher-screen type. The dewatered crystal mass is conveyed to the next stage (lithium oxide production), while the filtrate, a concentrated solution of lithium nitrate, is returned to a second-stage evaporator/crystalliser (not shown). A 'second strike' of lithium nitrate crystals may be obtained, to add to those of the first strike (but depending on their purity).

Depending upon the composition of the residual liquor (the filtrate/centrate) from this second strike crystallization, there may even be a third-strike of lithium nitrate crystals. The intent is to maximise the production of lithium nitrate crystals and minimise losses of lithium values in the final filtrate/centrate. In an embodiment, if the crystals from the second- or third-strike (if there is one) are of inadequate purity to be blended with the crystals from the first strike, or only a portion of them may be so added without jeopardizing the purity of the final lithium nitrate, some or all of the crystals from these subsequent strikes can be recycled to the concentrated solution of lithium nitrate produced from the solids-liquids separation stage ahead of feeding to the crystallization sub-stage. For the sake of clarity, this level of complexity is not set out in FIG. 2, but it is to be understood that the 'lithium nitrate crystallization' sub-stage may include some or all of these features.

The evaporation/crystallization sub-stage may also comprise apparatus for treating a side-stream (bleed-stream) or the full stream from a second-strike (or in an embodiment, a third-strike crystallization), of the filtrates produced by the separating apparatus used to dewater lithium nitrate crystals. This treating apparatus collectively can leave a solution concentrated in sodium and potassium ions (whose concentrations will continue to increase unless these metals are removed from time to time using this treating apparatus) along with residual lithium ions. This concentrated solution may then be treated by adding one or more soluble carbonates of alkali metals, preferably sodium carbonate and/or potassium carbonate. In either case, the addition of a soluble carbonate precipitates most of the remaining lithium values as sparingly soluble lithium carbonate, which may then be removed by filtration and washing, and recycled, including to the Termination and separation stage 14 in FIG. 2. The remaining solution, a blend of alkali metal nitrates, still containing some residual lithium ions, may be dewatered by evaporating the residual water, to leave a blend of alkali metal nitrates suitable for use as a heat transfer medium in the process as described earlier, including through the flites of the hollow-flite digestion reactor. Alternatively, the blend may find customers elsewhere, e.g. for storing solar energy in solar-thermal power stations, to allow electricity generation to proceed in the absence of direct solar insolation.

Lithium Oxide Production, Stage 18 (FIG. 2)

In this stage, illustrated by the reference numeral 18 in FIG. 2, the lithium nitrate from the Lithium Nitrate Production Stage 16 is converted to lithium oxide. During such conversion, the off-gases that are produced (including nitric oxide, nitrogen dioxide and oxygen) are collected and used to make more nitric acid; i.e. they are transferred to a nitric acid production plant (stage 22 in FIG. 2). In an embodiment as outlined earlier, some or all of these gases may first be directed to the Digestion reactor, where they may perform similarly to nitric acid as lixiviants of lithium values from the spodumene. Vapours surplus to these requirements would be directed to the nitric acid plant 22 in FIG. 2.

More specifically, the dewatered lithium nitrate crystals from the separating apparatus of stage 16 are passed to a stirred and heated vessel (e.g. a covered, insulated/jacketed tank) wherein the lithium nitrate crystals are heated as they are added to the hotter molten-salt contents of the tank. The tank contents are maintained at a temperature sufficient to melt the lithium nitrate crystals (at least to 260° C. and typically to ~400° C.). The tank is partially filled with the molten lithium nitrate such that, upon entering the molten lithium nitrate, the lithium nitrate crystals rapidly melt, adding to the contents of the tank. The temperature of the tank contents can be maintained by continuously circulating the mixture of alkali metal nitrate salts through a jacket around the tank, and then through the tubes of a convective heater. These tubes can, in turn, be heated by the exiting hot flue gases from e.g. the calciner of Pre-treatment stage 10 (i.e. the flue gases exiting the calciner can be at temperatures of ~800-900° C.) and/or by the flue gases and separately, vapours exiting the lithium nitrate decomposition reactor 18.

The pre-heating and melting of the lithium nitrate aids in its feeding to the subsequent lithium nitrate decomposition reactor, where the lithium nitrate is then better able to decompose to form lithium oxide.

The contents of the molten lithium nitrate salt tank are transferred to the lithium nitrate decomposition reactor wherein the molten lithium nitrate is further heated, for reasons given earlier, preferably indirectly, wherein the hot gas stream, which may be generated by, for example, by the combustion in air of natural gas or any other suitable clean fuel including carbon-containing fuels, does not come into contact with the lithium nitrate. The decomposition produces solid lithium oxide ($Li_2O$—lithia).

Additional heat may be added into the decomposition reactor directly, as a consequence of steps taken to make up for the inevitable losses of active nitrogen as this is circulated through the plant: as nitric acid, as lithium nitrate, and as oxides of nitrogen that are, in turn, used to reconstitute nitric acid. Two such embodiments are outlined earlier: the catalytic combustion of anhydrous gaseous ammonia in air, and heating air to very high temperatures in an electric arc, in accord with reactions 3) and 4) above.

The decomposition reactor operates at a temperature of a minimum ~600° C., preferably ~650° C. and as much as ~750° C. At these temperatures the lithium nitrate decomposes to form lithium oxide which, in the environment of the reactor, naturally forms pellets within the kiln.

The reactor emits a gaseous stream of oxides of nitrogen including nitrogen dioxide and nitric oxide, along with some oxygen from the decomposition of nitrate ions. Also contained in this gas stream are some water vapour as well as additional nitric oxide and other oxides of nitrogen from the combustion of the ammonia (or the electric arc heating of air). In an embodiment, wherein the lithium oxide decomposition reactor is an indirectly heated kiln, the off-gases are not contaminated with combustion products other than from the ammonia, if this embodiment is employed for making up losses of active nitrogen.

Lithium Hydroxide Production Stage 20 (FIG. 2)

In this stage, illustrated by the reference numeral 20 in FIG. 2, some or all (depending upon other uses for it) of the lithium oxide from the decomposition reactor is first converted to lithium hydroxide by adding and blending it with the appropriate amount of water. This can take place in a slaking vessel (e.g. a continuously stirred tank) to produce a concentrated solution of lithium hydroxide.

The concentrated solution of lithium hydroxide from the slaking vessel then passes to a second evaporator/crystalliser apparatus (e.g. also of the mechanical vapour recompression type). Here, the solution is further concentrated such that lithium hydroxide is caused to crystallize from the solution and form crystalline lithium hydroxide monohydrate. The quantity of lithium hydroxide monohydrate crystals produced (as a proportion of all lithium hydroxide entering the crystalliser unit) may be controlled, as may be desirable, for example, to meet customer demands for lithium chemicals in the form of lithium hydroxide. A resultant slurry from the evaporator/crystallizer of crystalline lithium hydroxide monohydrate is then separated and dewatered to produce high-purity lithium hydroxide monohydrate crystals from a balance of the lithium hydroxide which remains as an aqueous solution. The separation and dewatering apparatus can comprise a centrifuge, such as of the solid-bowl or screen-bowl decanter type, or continuous conical screen type, or it may comprise a pusher- or vibrating screen-type centrifuge.

While not shown for the sake of clarity in FIG. 2, the Lithium hydroxide production stage 20 can additionally comprise apparatus for drying, and driving off the water of crystallization from the produced lithium hydroxide monohydrate crystals, to produce a pure anhydrous lithium hydroxide product capable of meeting specific market specifications. The drying apparatus can comprise a fully enclosed hollow-flight screw conveyor, wherein hot molten alkali metal nitrate salt mix can be circulated through the hollow flights. A current of nitrogen gas circulates in a closed-circuit arrangement through the void space of the hollow-flight screw conveyor, whereby the lithium hydroxide monohydrate crystals are eventually heated to a temperature in excess of 160° C. (e.g. ~180° C.), sufficient to drive off the water of crystallization. The resultant pure, anhydrous lithium hydroxide can then be ground and packed as a product of the process/system.

The Lithium Hydroxide Crystallization stage 20 can further comprise apparatus for collecting and holding the saturated lithium hydroxide solutions remaining after the crystals of lithium hydroxide monohydrate have been removed (i.e. the filtrate/centrifuge centrate). The filtrate/centrate comprises a saturated aqueous solution of lithium hydroxide, which is collected in the covered tank. A little water (as well as other liquid streams) is added to dilute the tank contents such that there is no risk of ongoing crystallization of lithium hydroxide from solution.

This solution is then conveyed (e.g. pumped from the tank using separate pumps) in appropriate quantities to be recycled in the first case, to the Termination and Separation stage 14 to effect pH neutralisation of any remaining/surplus/excess nitric acid in the products of digestion/leaching in the Termination sub-stage, and precipitate magnesium ions present in the raw aqueous liquor as insoluble magnesium hydroxide. In the second case, another portion of the solution can be conveyed to a flue gas scrubber (of Scrubber Stage 24 in FIG. 2), where it is used to absorb/capture carbon dioxide contained in the flue, etc gases, by converting it to sparingly soluble lithium carbonate.

Nitric Acid Production Stage 22 (FIG. 2)

In this stage, illustrated by the reference numeral 22 in FIG. 2, the off-gases from the decomposition of the lithium nitrate are passed to a "Nitric acid plant". The excess nitric acid and water vapours that are distilled off in the Roasting section (No. 12 in FIG. 2) (hollow-flight conveyor) can also be passed to the nitric acid plant. The nitric acid plant can take the form of one, or a series of, absorption towers, such as those used in conventional Ostwald-Process nitric acid plants.

In the nitric acid plant (the operations of which will be familiar to those experienced with the commercial production of nitric acid by way of the Ostwald Process) the off-gases and distilled vapours are absorbed in a circulating stream of a continuously chilled solution of nitric acid in water, to produce more nitric acid, suitable for recirculation to the digestion/leaching reactor. This produces a concentrated solution of nitric acid (preferably at least 60% acid) that is appropriate for use in the digestion/leaching reactor. The oxides of nitrogen formed from the catalysed combustion of ammonia in air (in the lithium nitrate decomposition sub-stage) add to the total quantity of nitric acid produced and, in this manner, losses of nitric acid from the total process by, for example, imperfect washing of tailings or imperfect conversion of nitrogen oxides to nitric acid in the nitric acid plant, can be made good.

Scrubber Stage 24 (FIG. 2)

In this stage, illustrated by the reference numeral 24 in FIG. 2, filtered flue gases comprising carbon dioxide are scrubbed with the balance of concentrated lithium hydroxide solution produced in the Lithium Hydroxide Production Stage 20. Whilst the flue gases are primarily produced during thermal treatment of the silicate mineral, and from the natural gas fired in the indirect-fired lithium nitrate decomposition kiln (which yields a cleaner flue gas), carbon dioxide may also be sourced externally. The circulating solution absorbs/captures carbon dioxide contained in these flue, etc gases, by converting it to sparingly soluble lithium carbonate.

The flue gas scrubber can take the form of a largely empty chamber (e.g. tower) through which the concentrated lithium hydroxide solution is circulated and distributed via banks of sprays and at a relatively high volumetric rate. The lithium hydroxide reacts with carbon dioxide present in the flue gases and, in the process, is converted to lithium carbonate.

Because this is sparingly soluble, most of it precipitates from solution, converting the circulating scrubbing medium into a slurry of lithium carbonate in a lithium hydroxide-rich aqueous phase.

Lithium Carbonate Production Stage 26 (FIG. 2)

In this stage, illustrated by the reference numeral 26 in FIG. 2, the precipitated lithium carbonate crystals are classified so as to remove a proportion of the precipitated lithium carbonate crystals that continuously form in the lithium hydroxide-rich slurry circulating through the flue gas scrubber.

In an embodiment, the slurry of lithium carbonate in a lithium hydroxide-rich aqueous phase is pumped through a hydrocyclone or bank of hydrocyclones. The hydrocyclone spigot product (underflow stream) is comprised of a dense slurry of the coarser-size fraction of lithium carbonate crystals, which can be further separated from (i.e. dewatered and washed free of) their associated solution in e.g. a solid-bowl decanter centrifuge; or in a rotary drum vacuum filter apparatus.

The balance of the liquid phase (lithium hydroxide solution) from the bank of hydrocyclones (overflow stream) including the finer lithium carbonate crystals suspended within it, along with the solution separated from the dense slurry (i.e. as a result of dewatering and washing) of coarser-size lithium carbonate, are recirculated through the flue gas scrubber of Scrubber Stage 24.

Controls are fitted to the hydrocyclones to vary the effective diameters of their spigots to allow the volumetric split between spigot and overflow streams to be adjusted as required.

Lithium Carbonate Drying Stage 26 (FIG. 2)

In this stage, also illustrated by the reference numeral 26 in FIG. 2, the separated, coarser-size fraction of lithium carbonate crystals are subsequently dried and packed as a suitable (e.g. pure) lithium carbonate product of the process/system.

Lithium Metal Production Stages 28 and 30 (FIG. 2)

FIG. 2 shows two sub-stages appropriate for the manufacture of lithium metal from lithium oxide. Again, it is a unique feature of this process/system that lithium oxide is produced in such a convenient manner.

In one embodiment (sub-stage 28) lithium oxide is blended with a stoichiometric excess of powdered coke formed from very low-ash (below 0.5% inert solids) coal, and formed into briquettes or pellets, preferably without recourse to a binder (binderless briquettes). The briquettes are fed as required into a refractory-lined vessel (sub-stage 28) wherein the contents can be heated to temperatures of the order of 2,000° C. by electrical energy, either in the form of arcs struck between carbon electrodes and the mass of briquettes or pellets, or by induction heating, or by a combination of these methods. Under these conditions, the carbon in the briquettes/pellets reduces the lithium oxide to lithium metal which, under the prevailing conditions, is produced in the form of a vapour. In turn, the carbon is oxidised to carbon monoxide, a gas, according to reaction 7) above.

The blend of vapour-phase lithium and carbon monoxide then passes through a convergent-divergent nozzle to another vessel (sub-stage 30), which in an embodiment includes one or more cyclone separators. The internal pressure of this vessel is maintained substantially below that of the reduction furnace. On passing through the nozzle, the sudden fall in pressure accelerates the vapour-phase blend to supersonic velocities, and expansion occurs in milliseconds, shock-cooling the mix to temperatures well below the condensation temperature of lithium metal, and below those where there is a risk of the reverse reaction occurring, i.e. the reduction of carbon monoxide back to carbon, and oxidation of lithium metal to lithium oxide. A temperature in the range ~300° C. to ~400° C. is desirable, as lithium metal remains in a liquid state. The lithium metal collects on the walls of the cyclone separators (and there may be more than one stage of cyclone separators operating in series) and flows to the cyclone spigots as an underflow, thereby realizing a separation of lithium from the carbon monoxide. In an embodiment, the carbon monoxide, substantially free of lithium, may be used as fuel in the silicate mineral pre-treatment sub-stage (stage 10 in FIG. 2), partially offsetting natural gas requirements. The traces of lithium metal present in the carbon monoxide gas stream will immediately be converted to lithium oxide, then carbonate, when the carbon monoxide is fired.

Other unit operations can be included in the overall process and system shown in FIG. 2, consistent with good engineering practice, in particular, for the provision of services and utilities, the efficient utilisation of waste heat, the conservation of water, and the minimisation of all waste streams.

Figure 3A:
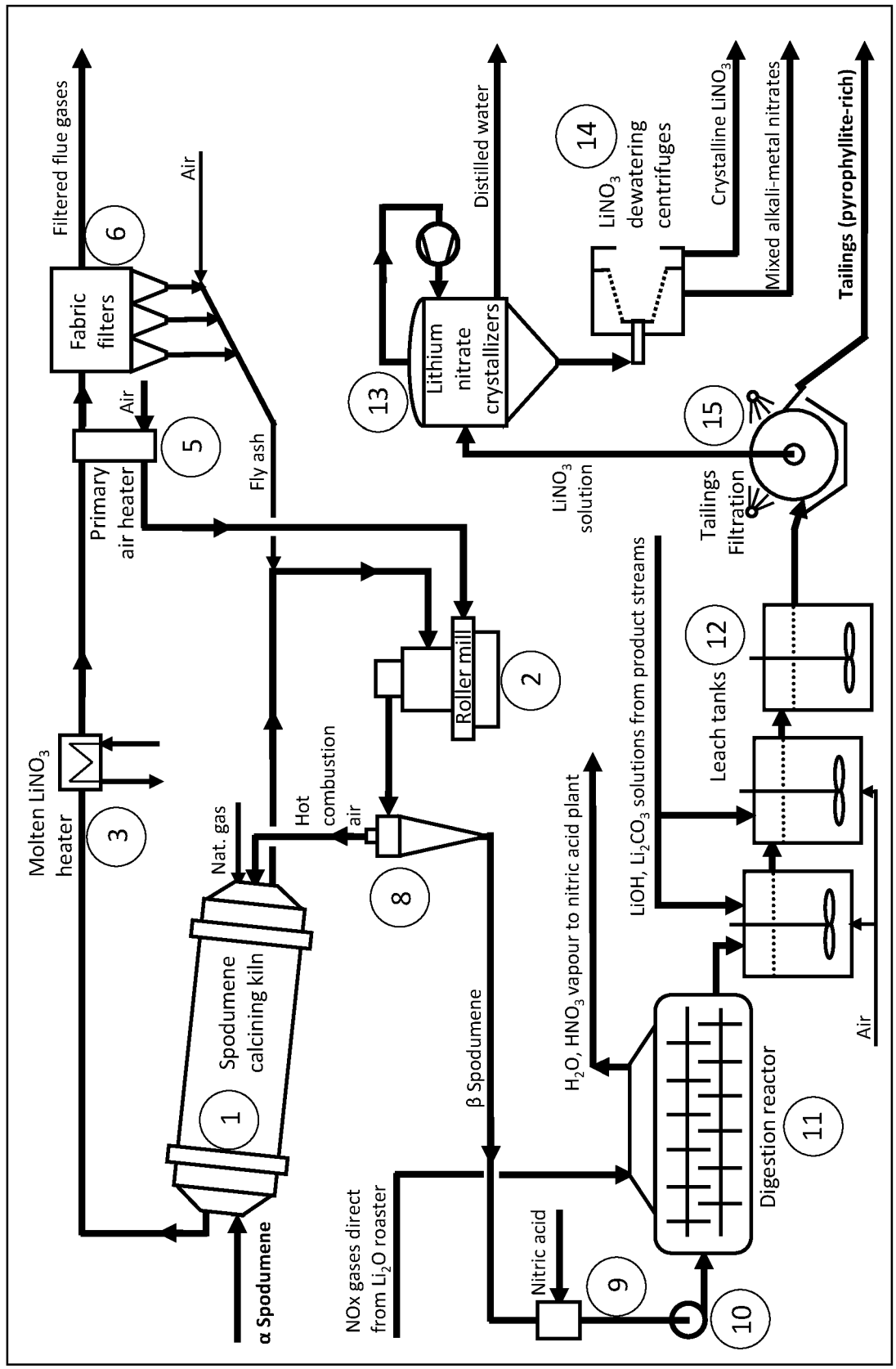
FIGS. 3A and 3B represent a schematic flow diagram that illustrates a more specific embodiment of the process and system.
Figure 3B:
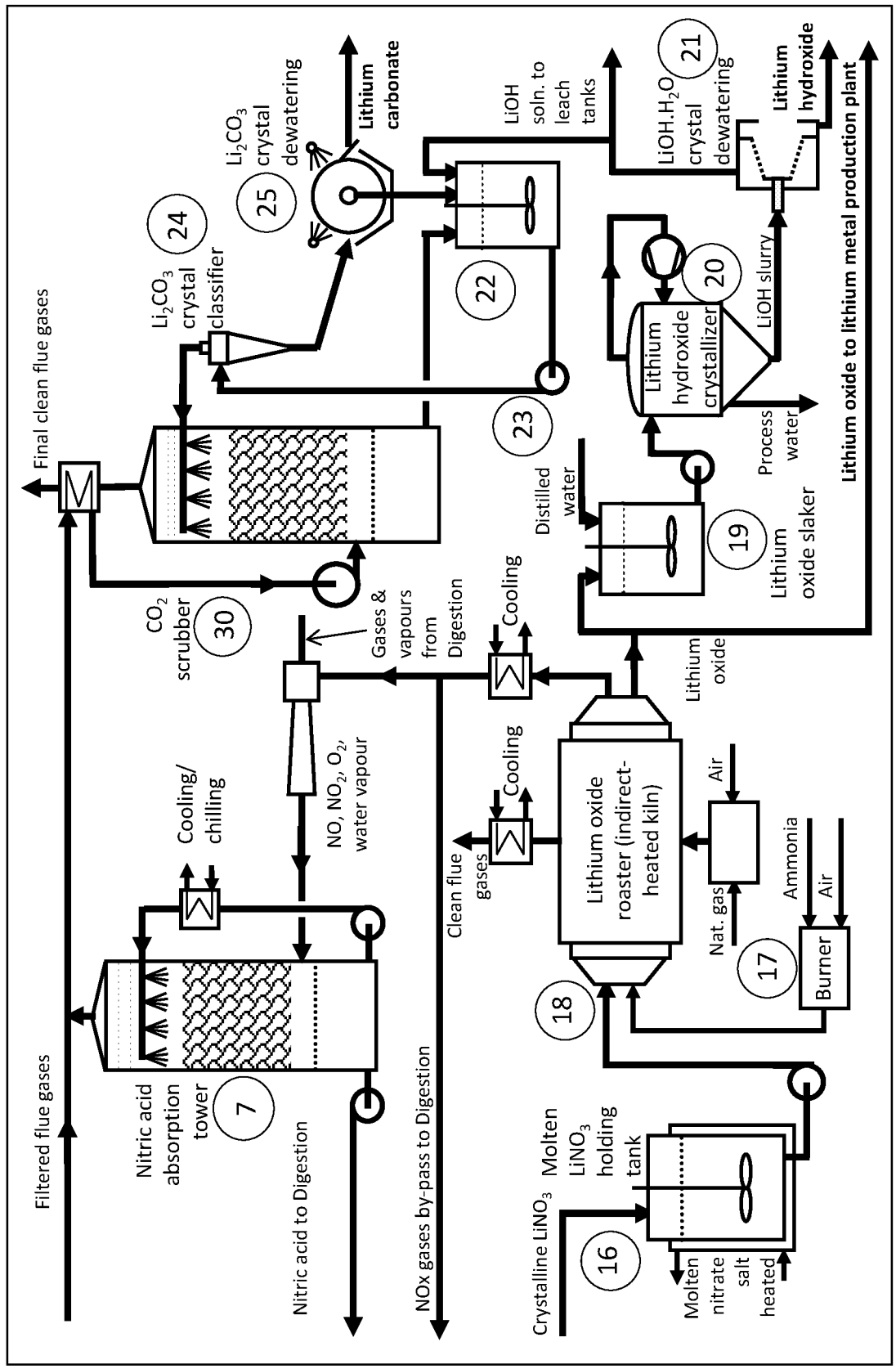

Process & System Embodiment (FIGS. 3A and 3B)

By way of an example of its possible implementation, FIGS. 3A and 3B depict schematically, a specific embodiment of the process and system for recovering lithium from a lithium-containing silicate mineral.

In FIG. 3A, a spodumene as a filter cake containing on average 10 percent water by weight, is fed into a first reactor in the form of a natural gas-fired rotary kiln 1, operating at an internal temperature around 1,050° C. as required for the 'decrepitation' of the α spodumene to the more reactive β form. Too-high temperatures risk vitrification of solids, making them resistant to leaching by nitric acid.

Most of the calcined 13 spodumene product from the calciner 1, partially cooled by the counter-current flow of hot gases and solids through the rotary kiln, passes to an air-swept dry grinding mill 2, for example a roller or table mill as commonly used for grinding (pulverizing) coal and other relatively soft rock e.g. limestone.

The hot combustion gases contain the balance of the calcined β spodumene product from the calciner 1. These gases are passed through one or more of a convective-type molten-salt heater 3, to heat a blend of alkali metal (lithium, sodium and potassium) nitrate salts to a temperature of approximately 400° C. A flow of molten alkali metal nitrates is used as the heat-transfer medium in the heater 3. As described below, the molten lithium nitrate can be used at various locations throughout the total plant. Although not shown on FIG. 3A, the gases, which are still hot, are then further cooled by passing them through a waste-heat boiler to generate high-pressure steam for use elsewhere in the process, and (in an embodiment) for electricity generation. As a result, the hot combustion gases from the calciner 1 are partially cooled firstly in the convective molten salt heater 3, and further cooled in the primary air heater 5, where some more of their sensible heat is transferred to ambient air destined for use as combustion air in the calciner 1.

The cooled combustion gases from the primary air heater 5 are cleansed of their burden of flue dust (the finer-sized portion of calcined β-spodumene) by passing them through a fabric filter station 6. The calcined β-spodumene solids removed at station 6 are transferred pneumatically (using air as a carrier) to join the main flow of calcined β-spodumene from the calciner 1 and then pass to the grinding mill 2. Using heated air from the air pre-heater 5, the ground calcined β-spodumene solids pass to a bank of dust cyclones 8, where these solids are separated from the air used to transport them. This now-heated air is ducted to the calciner 1 for use as combustion air.

The densified underflow of the dust cyclone bank 8, the calcined β-spodumene solids, passes to a pug mill-type mixer 9, to be blended with concentrated nitric acid from the nitric acid plant 7 (on FIG. 3B) to form a 'dry paste' containing 60% or higher, insoluble solids (the calcined β-spodumene) by weight. The quantity of nitric acid added exceeds that required to convert all of the lithium in the spodumene to lithium nitrate (the stoichiometric quantity). In this embodiment, the reaction between the nitric acid and calcined spodumene is undertaken at elevated pressures; other embodiments may resort to atmospheric pressures.

The paste then passes to the digestion reactor 11, which takes the form of a hollow-flite reactor, fully enclosed and capable of operation under elevated pressures. The pressures are achieved by way of a positive-displacement pump 10, for example a suitably configured Putzmeister™ (or equivalent) hydraulic piston pump (in an embodiment, the in-line pug mixer 9 and pump 10 are combined within a single unit). The still-hot calcined solids from the dust cyclones 8 transfer their heat to the paste, heating it to the working temperature of the reactor 10. In reactor 10, under the prevailing conditions of elevate pressure e.g. ~10 Bar and ~170-200° C. temperature, the lithium values in the silicate mineral ore are leached out in accordance with the reaction below.

$$2LiAlSi_2O_6 + 2HNO_3 \rightarrow 2LiNO_3 + 2LiAlSi_2O_5(OH)$$

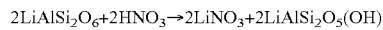

A blend of molten alkali-metal nitrate/nitrite salts is circulated through the hollow flites, its temperature adjusted to maintain the appropriate temperatures in the digesting paste. In practice, the molten salt blend will be heated in the course of its passage through the flites of the reactor, as the reaction above is exothermic.

In passing through the digestion reactor 11 the paste is further dried out to a cake as nitric acid is converted to lithium nitrate, and any unreacted nitric acid, plus any water, are distilled off as vapours. In this way, much of the surplus free acid is driven from the cake, so tendencies to continue the leaching of aluminium and other impurity base metals e.g. ferric iron, nickel, cobalt and others, are greatly slowed if not entirely stopped. The nitric acid-rich vapours from digestion reactor 11 are ducted to the nitric acid plant 7 (shown on FIG. 3B). Once there, they are allowed to expand to atmospheric pressure (in an embodiment) through an ejector, which also serves to blend, and partially cool, the gases passing to the nitric acid plant from the lithium oxide decomposition reactor 18.

The dry product from the digestion reactor 11, which is under pressure, enters a lock-hopper arrangement (not shown on FIG. 3A) to lower its pressure to atmospheric. While still fully enclosed, the solids are now slurried with an aqueous solution containing appropriate quantities of lithium hydroxide and lithium carbonate (both are products manufactured later in the process). In the embodiment shown on FIG. 3A, the solids are slurried in the first of a series of three covered tanks referred to as Leach tanks 12. The quantity of water added is sufficient to take all soluble species into solution, notably the lithium nitrate, and yield a readily pumpable slurry. Lithium hydroxide, present in this water in solution, which is strongly alkaline, is used to neutralise any excess nitric acid remaining after the lithium values in the spodumene accessible to leaching have been converted to lithium nitrate under the prevailing conditions, in accordance with reaction (1) and surplus nitric acid has been distilled off. The neutralisation reaction may be written thus:

$$HNO_3 + LiOH \rightarrow LiNO_3 + H_2O$$

It is seen that the product of this reaction is more lithium nitrate, to join that resulting from the main digestion reaction.

Were this excess acid not neutralised or otherwise removed, it would tend to continue to attack the now-barren spodumene, possibly causing increased quantities of aluminium, silicon, and any of the base metals (any of the transition metals including but not limited to chromium, manganese, iron, cobalt and nickel), and alkaline earth metals (in particular magnesium and calcium) to be leached, and converted into soluble salts, hence be present in solution in the aqueous phase. The quantity of lithium hydroxide added is sufficient to raise the pH number to mildly alkaline, i.e. between pH values of 8 and 11. In the Leach tanks 12, the highly soluble lithium nitrate present in the solids mass from digestion reactor 11 dissolves into the water that is blended with it to form a slurry comprised of a concentrated solution of primarily lithium nitrate and barren solids.

The lithium hydroxide present in the added water also serves to purge magnesium values from solution (they will be present as magnesium nitrate) by precipitating them as magnesium hydroxide, which is essentially insoluble in water under the prevailing conditions. Furthermore, carbonate ions present in the solution, including from the presence of some lithium carbonate in the aqueous solution used to slurry the solids from the digestion reactor 11, will serve to purge calcium values from solution (they will be present as calcium nitrate) by precipitating them as calcium carbonate, which is essentially insoluble in water under the prevailing conditions. Also shown schematically on FIG. 3A are facilities for sparging air into each of the leach tanks. This air serves primarily to oxidise any nitrite ions present in the aqueous phase to nitrate ions, a step that will simplify and render more efficient, subsequent lithium nitrate purification processes:

$$e.g.\ 2LiNO_2 + O_2 \rightarrow 2LiNO_3$$

The contents of the leach tanks 12 are pumped to a solids-liquids separation stage. As shown schematically in FIG. 3A this takes the form of a rotary drum vacuum filter 15, but it is equally likely that a horizontal-belt vacuum filter could be used. The filtration stage raises the solids concentration of the filter cake up to ~85% by weight and, by means of hot washwater, essentially all solubles (including all soluble lithium values) are washed from the filter cake. The filtrate will therefore contain essentially all of the lithium values leached from the spodumene ore concentrates, but now as soluble lithium nitrate. The filter cake, essentially devoid of soluble forms of lithium, may at a minimum, be safely emplaced for long-term storage (i.e. tailings). The cake may also be used as a raw material for the manufacture of Portland cement, but it is likely that more attractive markets may be found for it insofar as most of the alumina and silica values may be present as the hydrated aluminium silicate mineral pyrophyllite, which is valued in many industries for its zeolite-like characteristics.

The filtrate (which may also be referred to as pregnant liquor) is transferred (such as by way of pumps, piping and a holding tank, not shown for clarity in FIG. 3A) into the lithium nitrate crystallizer 13. In the embodiment shown in FIG. 3A this crystallizer 13 is based on the principle of mechanical vapour recompression, with evaporation occurring at sub-atmospheric pressure, and with the vapour re-compressed for re-use in the heating calandria (an internal part of the evaporation vessel not shown for reasons of clarity on FIG. 3A). Water vapour condensing in the calandria is condensed and collected for re-use elsewhere in the process as pure process water, in particular for recovering lithium values in the filter cakes formed in the Tailings filtration unit 15. The main product of the crystallizer 13 is a slurry of lithium nitrate crystals in a saturated solution of lithium nitrate, perhaps with small quantities of impurities also in solution. During operation this slurry is circulated through the crystallizer 13. A proportion of this slurry is withdrawn from this main circulating flow and sent to a centrifuge 14, such as of the solid-bowl decanter type, or screen-bowl decanter type, or a continuous conical screen type, or a pusher or a vibrating-screen type. The mass flow rate at which crystal slurry is withdrawn and fed to the dewatering centrifuge is set such that the mass rate of crystal production (as cake from the centrifuge 14) matches the rate that new lithium nitrate solution is fed to the crystallizer 13.

Not shown on FIG. 3A for the sake of clarity are additional items of plant and equipment contained in the unit operation marked lithium nitrate crystallizer 13. There may, for example, be a second or even a third crystallizer effect (and with each effect, a crystal dewatering centrifuge), wherein the solution stripped of its content of lithium nitrate crystals (the 'first-strike' crystals) by the centrifuge 14 is subjected to further concentration and crystallization of additional lithium nitrate (production of second and perhaps third strikes), and separation of crystals formed by the associated centrifuges, leaving a residual solution that has had most of its lithium values removed as crystalline lithium nitrate. The purity of the lithium nitrate crystals obtained in the second and third strikes may be expected to be lower than for the first strike. Should any fall below purity specifications, they may be recycled by adding them to the pregnant liquor from the tailings filtration unit 15. It is expected, however, that the purity of the combined crystal mass separated from the product crystal slurries from all evaporator/crystallizer effects is adequate to ensure final product quality specifications are met.

It follows that the concentrations of other soluble salts, in particular sodium and potassium ions, in the residual liquors will continue to rise with passage through the first, second and (if present) third evaporator/crystallizer effects of the lithium nitrate crystallizer 13. Further processing to recover additional lithium values in the residual concentrated solution of alkali metal nitrates can be justified. For example, sodium carbonate (soda ash) and/or potassium carbonate can be added as a solution to precipitate most of the residual lithium as sparingly soluble lithium carbonate. With addition of sodium carbonate the reaction is:

$$2LiNO_3 + Na_2CO_3 \rightarrow Li_2CO_3 + 2NaNO_3$$

The lithium carbonate precipitate can be removed by conventional solids-liquids separation processes, such as by vacuum filtration and washing with hot water. Depending on its quantity and purity, this lithium carbonate can be added to the final product lithium carbonate, or it can be recycled to the digestion reactor 11. The sodium nitrate (alternatively, potassium nitrate, should potassium carbonate be used instead of sodium carbonate) will merely add to the sodium (and/or potassium) nitrate already present in the barren solution. The resulting residual solution will be a mix of lithium, sodium and potassium nitrates; the proportions of the latter may be adjusted by simply choosing the proportions of potassium and sodium carbonates selected for precipitating lithium values. Once evaporated to dryness and heated above the blend's melting point, this blend may be valued by the operators of inter alia, solar thermal power plants with storage (e.g. a chemical battery). It is this blend that may be used in the process/system as a heat transfer medium in the digestion reactor 11 and elsewhere as described earlier.

The dewatered mass of lithium nitrate crystals from the LiNO_3 dewatering centrifuges 14 (FIG. 3A) is conveyed to the molten lithium nitrate holding tank 16 (FIG. 3B). The contents of this tank are maintained at close to 400° C. by circulating some of the molten nitrate salt blend produced as described previously through a jacket surrounding the holding tank 16. At such temperatures the salt is a clear, colourless and highly mobile liquid. Lithium nitrate crystals entering the holding tank 16 and then falling into the molten lithium nitrate soon melt to add to the mass of molten lithium nitrate.

Molten lithium nitrate is transferred as required to the lithium oxide roaster 18, wherein the crystals are heated rapidly to a temperature in excess of 600° C., ideally to ~750° C. In the embodiment shown in FIG. 3B, this roaster takes the form of an indirectly heated rotary kiln. Natural gas is fired externally to the kiln shell, which is made of heat-resistant stainless steel such as Type 310. As soon as molten lithium nitrate, which is sprayed or otherwise distributed over the tumbling solids in the kiln (which will be mostly lithium oxide), contacts the solids it is rapidly heated and, in the process, it decomposes to form lithium oxide, with the emission of nitrogen dioxide and oxygen according to the following reaction:

$$4LiNO_3 \rightarrow 2Li_2O + 4NO_2 + O_2$$

In FIG. 3B, a mix of anhydrous ammonia and air is shown as being combusted in a burner 17 fitted with a platinum-rhodium catalyst, whereupon the combustion products, namely, water vapour, nitric oxide and air depleted in oxygen, blend with the nitric oxide and oxygen from the decomposition of the lithium nitrate. The reaction for the catalytic combustion of ammonia in air may be written as:

$$4NH_3 + 5O_2 \rightarrow 4NO + 6H_2O$$

The quantity of ammonia fired depends on the quantities of active nitrogen that need to be made up as a result of losses of nitric acid and other forms of active nitrogen through the normal operation of this closed process.

The nitric oxide upon cooling (e.g. through the cooler shown in FIG. 3A) combines with free oxygen present in the combustion gases to form nitrogen dioxide:

$$2NO + O_2 \rightarrow 2NO_2$$

The nitrogen dioxide, along with that formed from the decomposition of lithium nitrate according to reaction (5), plus water and free oxygen, plus the off-gases from the dryer 11, pass to the nitric acid plant, where they all combine to form nitric acid, with the nitric oxide formed subsequently oxidised to nitrogen dioxide as per the previous reaction:

$$H_2O + 3NO_2 \rightarrow 2HNO_3 + NO$$

The nitric acid plant 7 can be sourced from a company experienced in the design and construction of Ostwald-Process nitric acid plants from ammonia. However, most of the infrastructure required for the catalytic combustion of ammonia to form oxides of nitrogen in the same manner as presented in reaction (6) would not be required (apart from in a much reduced form—i.e. just for the combustion of the ammonia in the small burner 17).

The nitric acid plant 7 consists of one or more columns arranged in series, each fitted with sieve trays or bubble caps, through which a cooled mix of nitric acid and water is continuously circulated. This rapidly absorbs the nitrogen dioxide and oxygen to form more nitric acid, the concentration of which can be under steady-state conditions, such as ~60% concentration acid or higher (a preferred product is at least 68% nitric acid). The nitric acid plant 7 can also comprise a separate distillation column (for the sake of clarity not shown in FIG. 3B), where the relatively dilute nitric acid produced in the plant is divided into two streams: a concentrated acid (nominally 68% nitric acid) stream, and an aqueous stream containing little if any nitric acid, which may be used as process water elsewhere in the plant. Acid is drawn off at the appropriate rate and transferred to a storage tank (not shown in FIG. 3B), from where it may be pumped as required to the digestion reactor 11.

The lithium oxide (lithia) pellets formed in the lithium oxide roaster 18, are partially cooled in a section of the kiln by arranging for some of the combustion air (i.e. air that will be used to support the combustion of natural gas in upstream sections of the kiln) first to pass over the outer shell of the kiln proper, thereby cooling the solids passing within. Partially cooled prills of pure lithium oxide (lithia) are then quenched in the lithium oxide slaker 19. In this regard, a controlled volume of distilled water is added to the slaker 19 (including e.g. condensate from the evaporator/crystallizers 13), whereupon it is converted to lithium hydroxide:

$$Li_2O + H_2O \rightarrow 2LiOH$$

This process is strongly exothermic, so the vessel can be continuously cooled using circulating cooling water (not shown in FIG. 3B). The quantity of water added to storage tank 19 is sufficient to dissolve the desired quantity of lithium oxide and to convert it all to the hydroxide, according to reaction (9), and take this lithium hydroxide fully into solution to form a near-saturated solution of lithium hydroxide.

This near-saturated solution of lithium hydroxide is then transferred to the lithium hydroxide crystallizer 20, which in the embodiment shown in FIG. 3B is also shown schematically to be of the mechanical vapour recompression type. Here, some water vapour is boiled off, causing some crystals of lithium hydroxide monohydrate $LiOH.H_2O$ to form in suspension in the now-saturated lithium hydroxide solution. The quantity of water boiled off is carefully controlled so that the quantity of lithium hydroxide monohydrate crystals produced matches the quantity of lithium hydroxide required to meet the particular contracted demand for it. An appropriate proportion of this slurry is withdrawn from the crystallizer 20 and is sent to a centrifuge 21. In the embodiment of FIG. 3B, the centrifuge is of a continuous conical screen type, but it may be of the solid-bowl decanter type, or screen-bowl decanter type, or the pusher or vibrating screen type.

The solid crystalline cake produced by the centrifuge can be further processed (by way of equipment not shown for the sake of clarity in FIG. 3B). First, it may be dried, then packaged for despatching. Alternatively, it may be further heated to drive off the water of crystallization using processes known to those skilled in the art. For example, by using reduced pressure conditions and by heating to a temperature of at least 160° C. to drive off the water of crystallization to create an anhydrous lithium hydrate product. The water vapour that is distilled off can be collected and condensed to produce additional pure process water for use elsewhere in the total process.

The centrifuge centrate/filtrate, a saturated aqueous solution of lithium hydroxide, is collected in another covered tank 22, where a little process water, plus other liquid streams that also enter tank 22, are added to dilute the solution, so that there is no risk of ongoing crystallization of lithium hydroxide from the solution. From this tank 22, lithium hydroxide solution is pumped using separate pumps, as follows:

to the leach tank 12 (FIG. 3A), in sufficient quantity to neutralise any remaining surplus nitric acid in the product stream from the dryer 11, i.e. to raise the pH number within the leach tank 12 to between 8 and 11;

the balance, to the flue gas scrubber 30, using pump 23, where it is used to absorb carbon dioxide contained in the flue gases and thereby be converted to lithium carbonate.

The reaction between the relatively concentrated lithium hydroxide solution circulating through the scrubber 30 and carbon dioxide contained in flue gases can be written as:

$$2LiOH + CO_2 \rightarrow Li_2CO_3 + H_2O$$

The temperature of the circulating slurry (circulation is maintained by pumps 23) is maintained at a temperature above 60° C. and preferably 80° C. to ensure that no lithium bicarbonate is formed. Lithium carbonate is much less soluble than lithium hydroxide, so most of the lithium carbonate formed according to reaction (10) is precipitated from solution as pure crystals of lithium carbonate. These circulate through the scrubber 30 as components of a slurry of lithium carbonate in a solution of lithium hydroxide (plus some lithium carbonate also in solution). During such circulation, the lithium carbonate crystals tend to grow in size. As the slurry circulates it passes through a classifying device, the $Li_2CO_3$ crystal classifier 24, schematically shown in FIG. 3B as a hydrocyclone that classifies out the larger crystals, concentrating them to a dense slurry as a spigot product. The remainder of the slurry including most of the solution and the finer crystals of lithium carbonate are returned to the scrubber 30 via the receiving tank 22.

The spigot product passes to the $Li_2CO_3$ crystal dewatering device 25, in an embodiment a solid-bowl decanter centrifuge (or in the embodiment shown in FIG. 3B, a vacuum drum filter). The solid cake of pure lithium carbonate produced is dried, ground and packaged as required under the terms of sale to customers.

The balance of the lithium oxide can be converted to lithium metal. Apart from the fact that this process conveniently produces lithium oxide, the essential precursor for carbothermal reduction processes, the particular technologies to be used would involve plant and processes that have been disclosed elsewhere e.g. in U.S. Pat. No. 9,090,954, or potentially U.S. Pat. Nos. 4,147,534, and 4,200,264.

Further Variations

It is to be understood that the characteristics of the spodumene, whether the original (α) or activated (β) form, may differ to the extent that variations to the above method and system may be appropriate. Other unit operations can be included in the overall process in line with good engineering practices, in particular, for the provision of services and utilities, the efficient utilisation of waste heat, the conservation of water, and the minimisation of all waste streams.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features.

The invention claimed is:

1. A process for producing lithium metal from a lithium-containing silicate mineral, the process comprising:
   subjecting the silicate mineral to an acid leach in a leaching reactor in which lithium is extracted from the silicate mineral;
   thermally treating the extracted lithium in a thermal treatment unit so as to convert it into lithium oxide;
   subjecting the lithium oxide to a carbothermal reduction stage in a carbothermal reduction furnace in which the lithium oxide is mixed with a source of carbon;
   wherein the carbothermal reduction stage is operated at a temperature sufficient to cause the lithium oxide to be reduced to lithium metal and the carbon source to be oxidised into gaseous form.

2. A process according to claim 1, wherein, immediately following the reduction stage, the lithium metal as vapour and the gaseous oxidised carbon are rapidly cooled so as to form liquid lithium metal.

3. A process according to claim 2, wherein the lithium metal vapour and the gaseous oxidised carbon are rapidly cooled by expansion.

4. A process according to claim 2, wherein a mixture of the liquid lithium metal and the gaseous oxidised carbon is separated one from the other.

5. A process according to claim 1, wherein, in the acid leach the silicate mineral is mixed with nitric acid under conditions such that lithium values in the silicate mineral are leached from the silicate mineral as lithium nitrate.

6. A process according to claim 5, wherein the leach conditions comprise increased temperature and/or pressure to accelerate leaching of lithium values from the silicate mineral as lithium nitrates, but such that non-lithium values in the silicate mineral tend not to be leached from the silicate mineral, and wherein the leach conditions further comprise reacting the silicate mineral in a stoichiometric excess of nitric acid, for a controlled period of time, wherein the controlled period is terminated by:
   (i) neutralising residual free nitric acid; and/or
   (ii) heating the product of leaching so as to distil the excess of nitric acid along with water as vapour.

7. A process according to claim 6, wherein in (i) the residual free nitric acid is neutralised by an alkaline lithium compound that comprises one or more of: $Li_2O$, $LiOH$ and $Li_2CO_3$.

8. A process according to claim 6, wherein in (ii) the excess of nitric acid and water vapour are distilled off as vapours in a drying stage, and wherein the distilled nitric acid and water vapour are collected for reuse in the acid leach and/or for regenerating nitric acid.

9. A process according to claim 5, further comprising a crystallisation stage in which a solution of lithium nitrate produced by the acid leach is concentrated and crystallised to form crystalline $LiNO_3$.

10. A process according to claim 9, wherein the crystallised $LiNO_3$ is separated from solution and wherein the separated crystalline $LiNO_3$ is thermally treated, at a temperature that causes decomposition of the $LiNO_3$ into $Li_2O$, and such that a gaseous stream that comprises oxides of nitrogen is produced.

11. A process according to claim 10, wherein the thermal treatment comprises indirect heating of the $LiNO_3$ with the gaseous stream being collected for reuse in the acid leach and/or for regenerating nitric acid.

12. A system for producing lithium metal from a lithium-containing silicate mineral, the system comprising:
   a leaching reactor in which a mixture of the silicate mineral and nitric acid is subjected to conditions such that lithium in the silicate mineral is leached from the silicate mineral as lithium nitrate;
   a thermal treatment unit configured to operate at a temperature that causes lithium nitrate from the leaching reactor to decompose into solid $Li_2O$;
   a carbothermal reduction furnace in which a blend of the solid $Li_2O$ and a source of carbon is heated to a temperature sufficient to cause the lithium oxide to be reduced to lithium metal and the carbon source to be oxidised into gaseous form.

13. A system according to claim 12, further comprising a flash-cooling apparatus in which the resultant lithium metal is condensed as a liquid.

14. A system according to claim 13, wherein the flash-cooling apparatus comprises a convergent-divergent nozzle.

15. A system according to claim 13, further comprising a cyclone separator in which the condensed liquid lithium metal from the flash-cooling apparatus and the gaseous oxidised carbon are separated.

16. A system according to claim 12, wherein the thermal treatment unit comprises a roaster.

17. A system according to claim 12, further comprising a nitric acid plant, the nitric acid plant arranged to receive gaseous streams that contain oxides of nitrogen and/or nitric acid vapour from the leaching reactor, the thermal treatment unit and/or from the carbothermal reduction furnace, the nitric acid plant being further arranged to produce nitric acid for use in the leaching reactor.

18. A system according to claim 12, wherein the leaching reactor comprises:
   a pressure vessel such as an autoclave in which leaching is conducted at elevated temperatures and pressures; or
   a digestion reactor such as a hollow-flite screw conveyor in which leaching is conducted at elevated temperatures but at atmospheric pressure.

19. A system according to claim 12, further comprising a crystallizer in which a lithium nitrate solution from the leaching reactor is concentrated and crystallised to form crystalline $LiNO_3$.

20. A system according to claim 19, further comprising a heated holding vessel in which the crystalline $LiNO_3$ is heated to a molten state, prior to the molten $LiNO_3$ being passed to the thermal treatment unit.

21. A process according to claim 3, wherein the lithium metal vapour and the gaseous oxidised carbon are rapidly cooled by supersonic expansion through a convergent-divergent nozzle.

22. A process according to claim 4, wherein the mixture of the liquid lithium metal and the gaseous oxidised carbon is separated, one from the other, by passing the mixture through a cyclone separator.

23. A process according to claim 10, wherein the crystallised $LiNO_3$ is separated from solution by centrifugation.

24. A process according to claim 11, wherein the thermal treatment comprises indirect heating of the $LiNO_3$ by a catalysed burning of ammonia in an excess of air.

* * * * *